Oct. 25, 1949. T. H. BARTH 2,485,953
AIRCRAFT CONTROL SYSTEM
Filed April 24, 1940 21 Sheets-Sheet 4
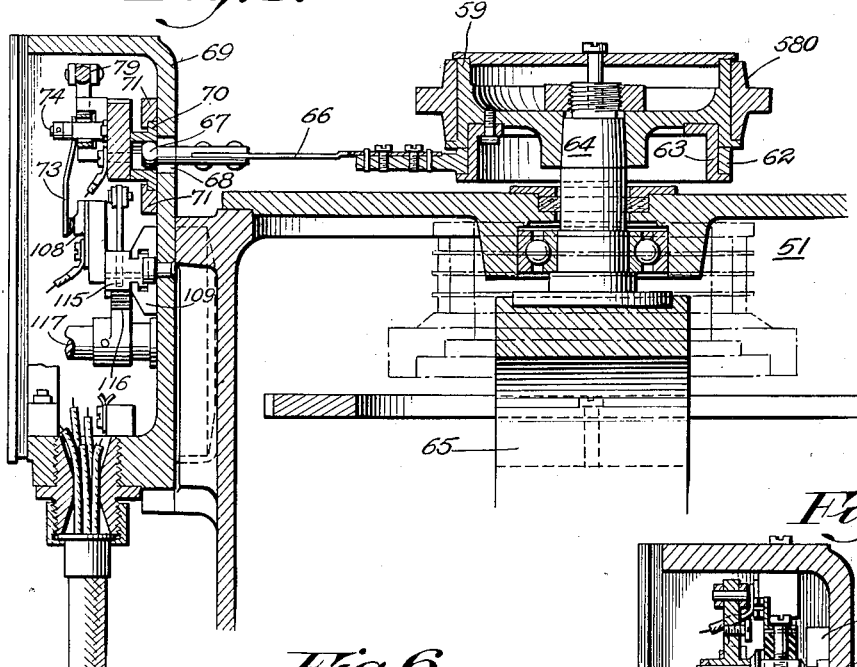
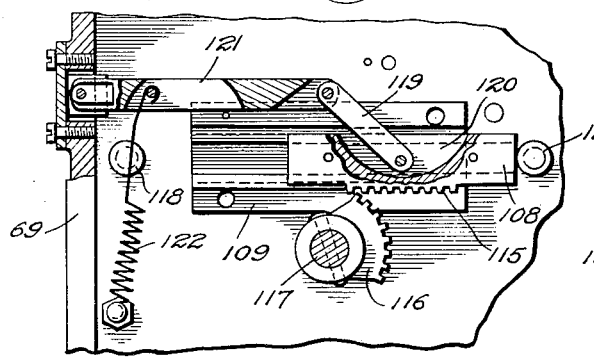
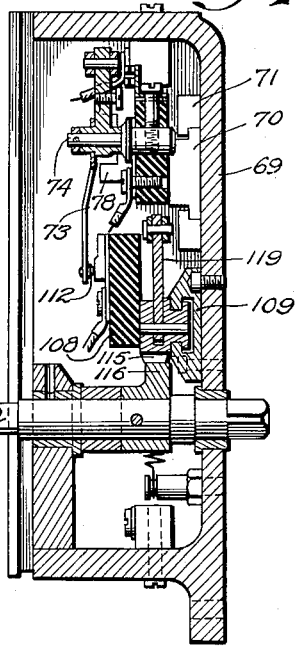
T. H. Barth
INVENTOR
BY W. Glenn Jones
ATTORNEY Oct. 25, 1949.　　　　T. H. BARTH　　　　2,485,953
AIRCRAFT CONTROL SYSTEM
Filed April 24, 1940　　　　　　　　　　　21 Sheets-Sheet 5
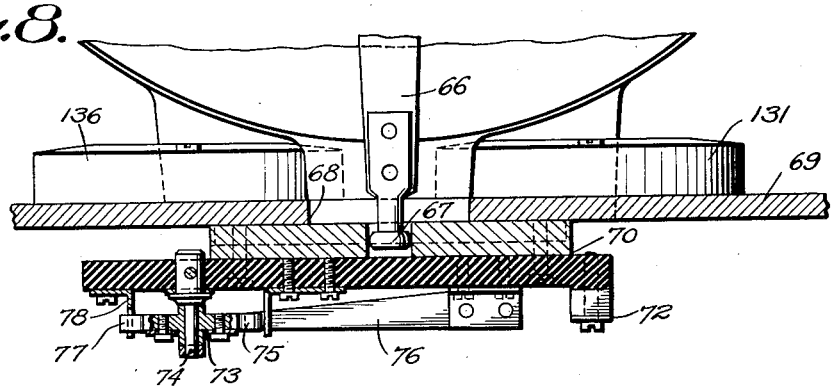
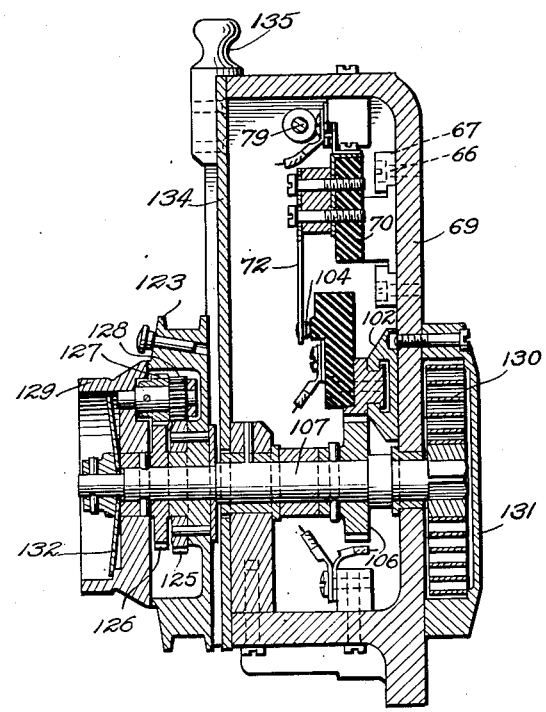
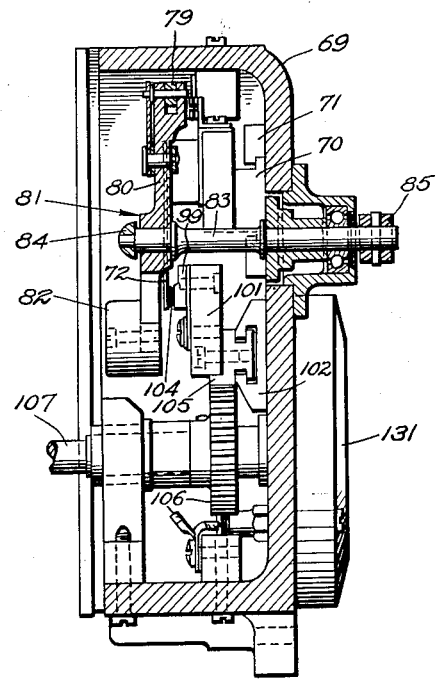
INVENTOR
T. H. Barth
BY
ATTORNEY

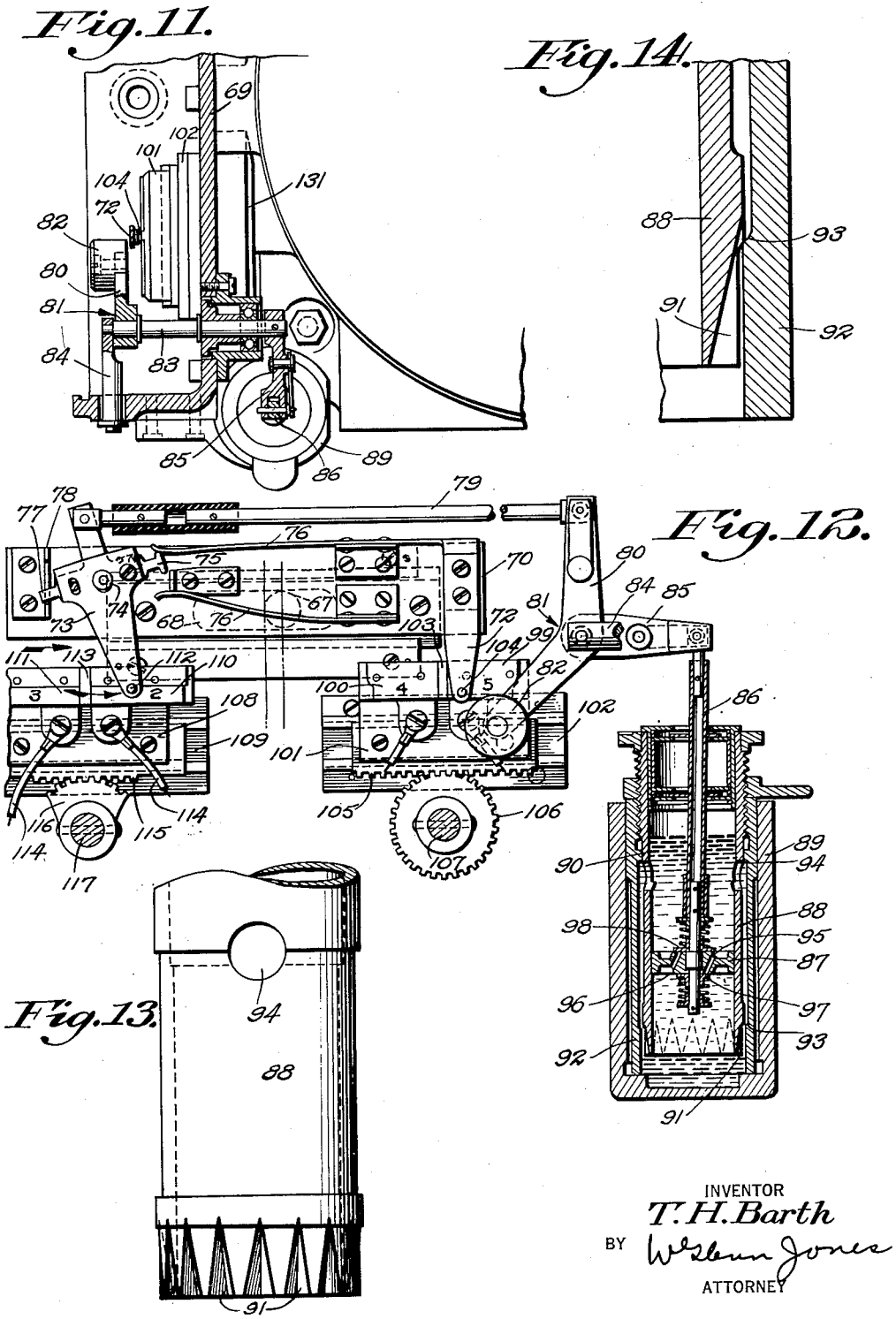

Inventor
T. H. Barth
By W. Glenn Jones
Attorney

Oct. 25, 1949.　　　T. H. BARTH　　　2,485,953
AIRCRAFT CONTROL SYSTEM
Filed April 24, 1940　　　　　　　　　21 Sheets-Sheet 8

T. H. Barth
INVENTOR

BY W. Glenn Jones
ATTORNEY

T. H. Barth
INVENTOR

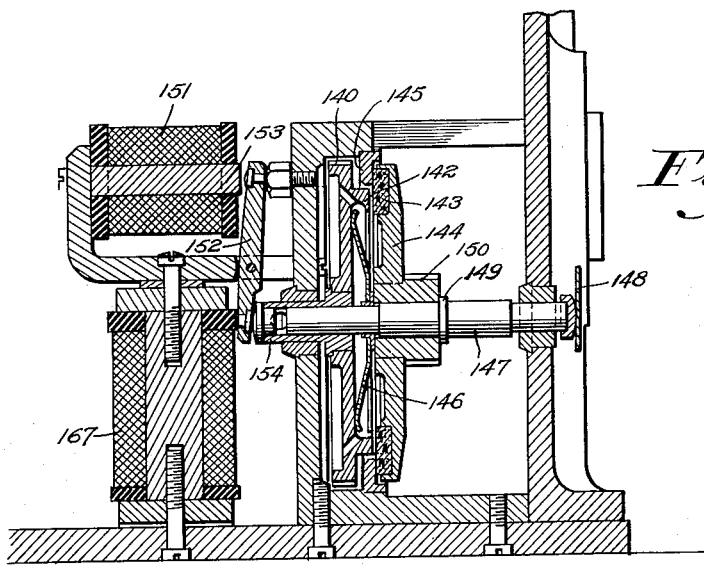
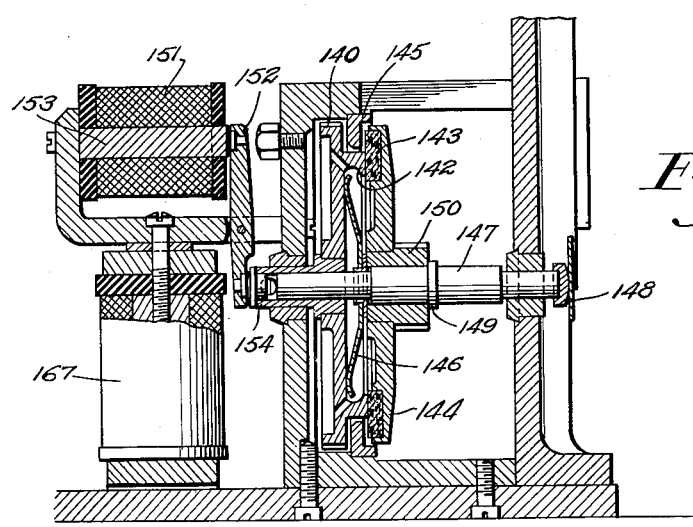

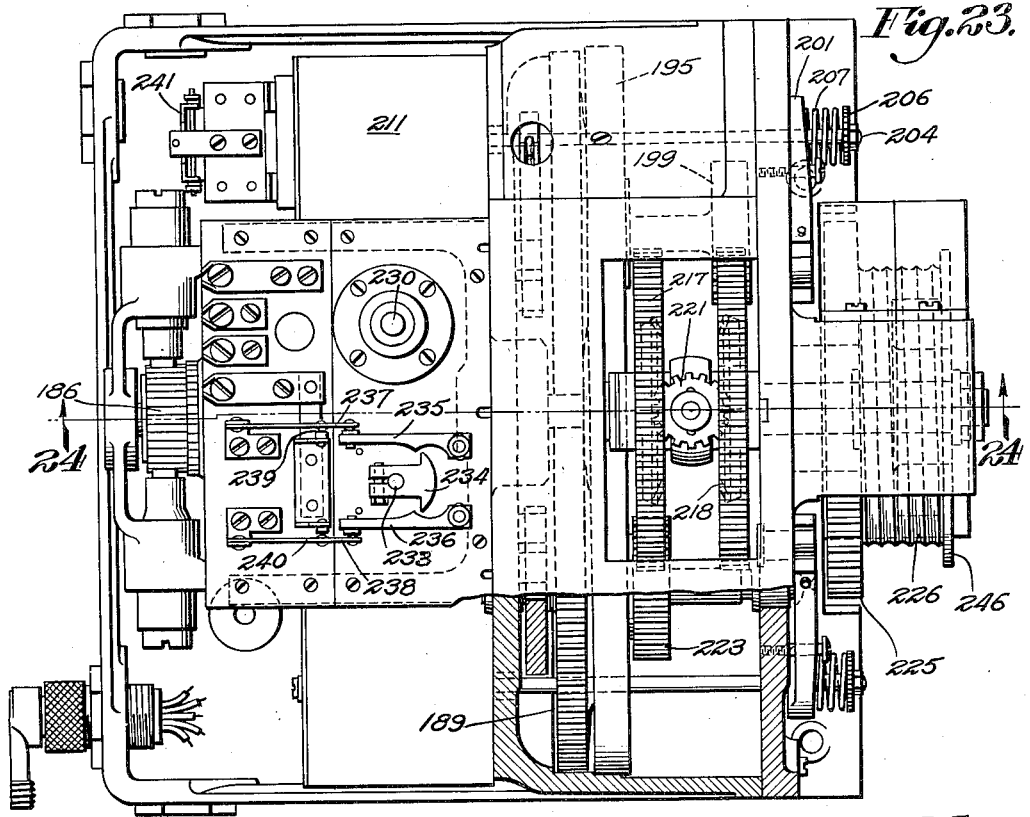

T. H. Barth
INVENTOR

ATTORNEY

T. H. Barth
INVENTOR
ATTORNEY

Oct. 25, 1949. T. H. BARTH 2,485,953
AIRCRAFT CONTROL SYSTEM
Filed April 24, 1940 21 Sheets-Sheet 14

T. H. Barth
INVENTOR

BY W. Glenn Jones
ATTORNEY

Oct. 25, 1949.　　　　T. H. BARTH　　　　2,485,953
AIRCRAFT CONTROL SYSTEM
Filed April 24, 1940　　　　　　　　　　　　21 Sheets-Sheet 15

FORE

T. H. Barth
INVENTOR

BY W. Glenn Jones
ATTORNEY

Oct. 25, 1949.

T. H. BARTH 2,485,953

AIRCRAFT CONTROL SYSTEM

Filed April 24, 1940

T. H. Barth
INVENTOR

BY W. Glenn Jones
ATTORNEY

Oct. 25, 1949.   T. H. BARTH   2,485,953
AIRCRAFT CONTROL SYSTEM
Filed April 24, 1940   21 Sheets-Sheet 17

T. H. Barth
INVENTOR

BY W. Glenn Jones
ATTORNEY

Oct. 25, 1949.  T. H. BARTH  2,485,953
AIRCRAFT CONTROL SYSTEM
Filed April 24, 1940  21 Sheets-Sheet 18

T. H. Barth
INVENTOR
BY W. Glenn Jones
ATTORNEY

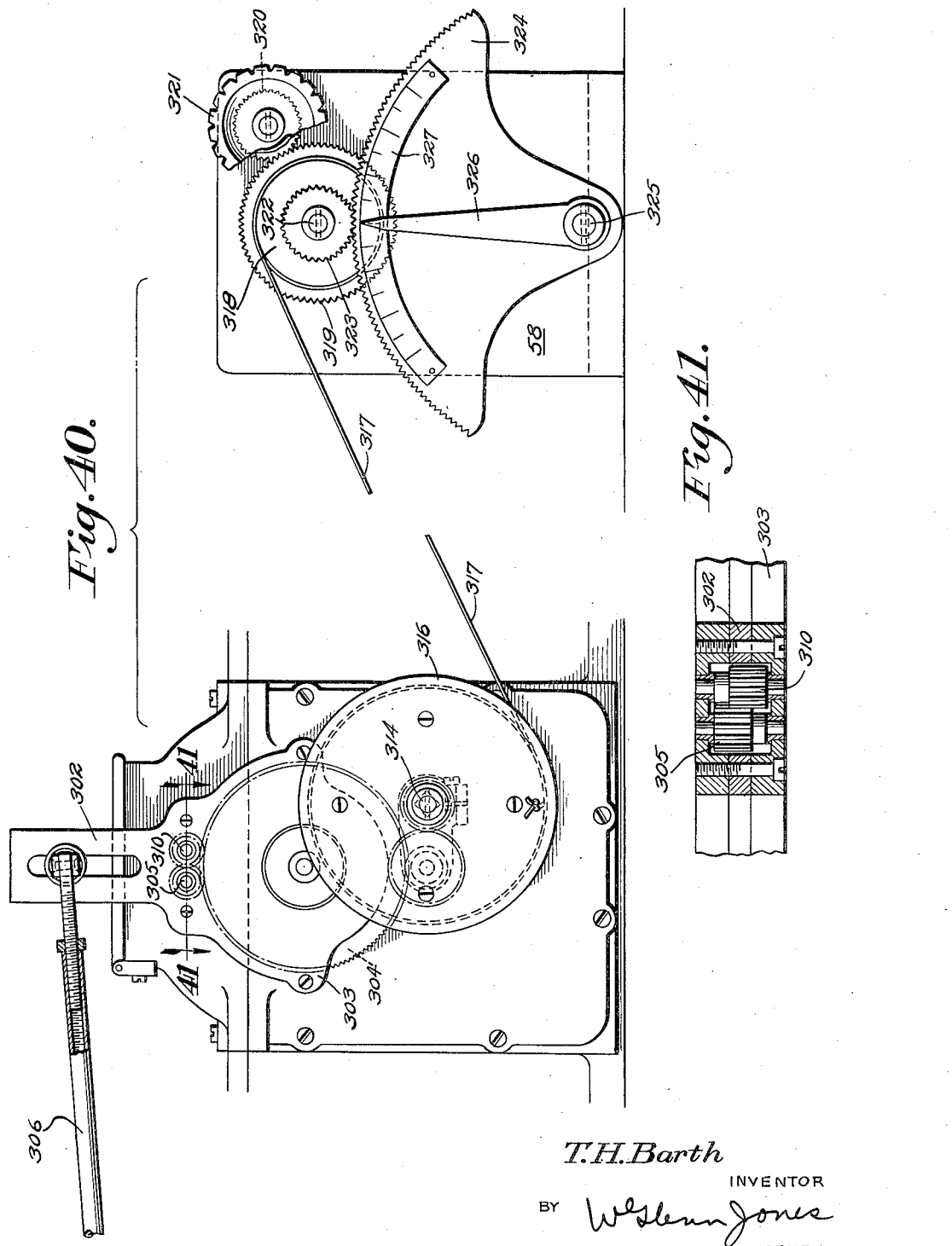

Oct. 25, 1949.  T. H. BARTH  2,485,953
AIRCRAFT CONTROL SYSTEM
Filed April 24, 1940  21 Sheets-Sheet 20
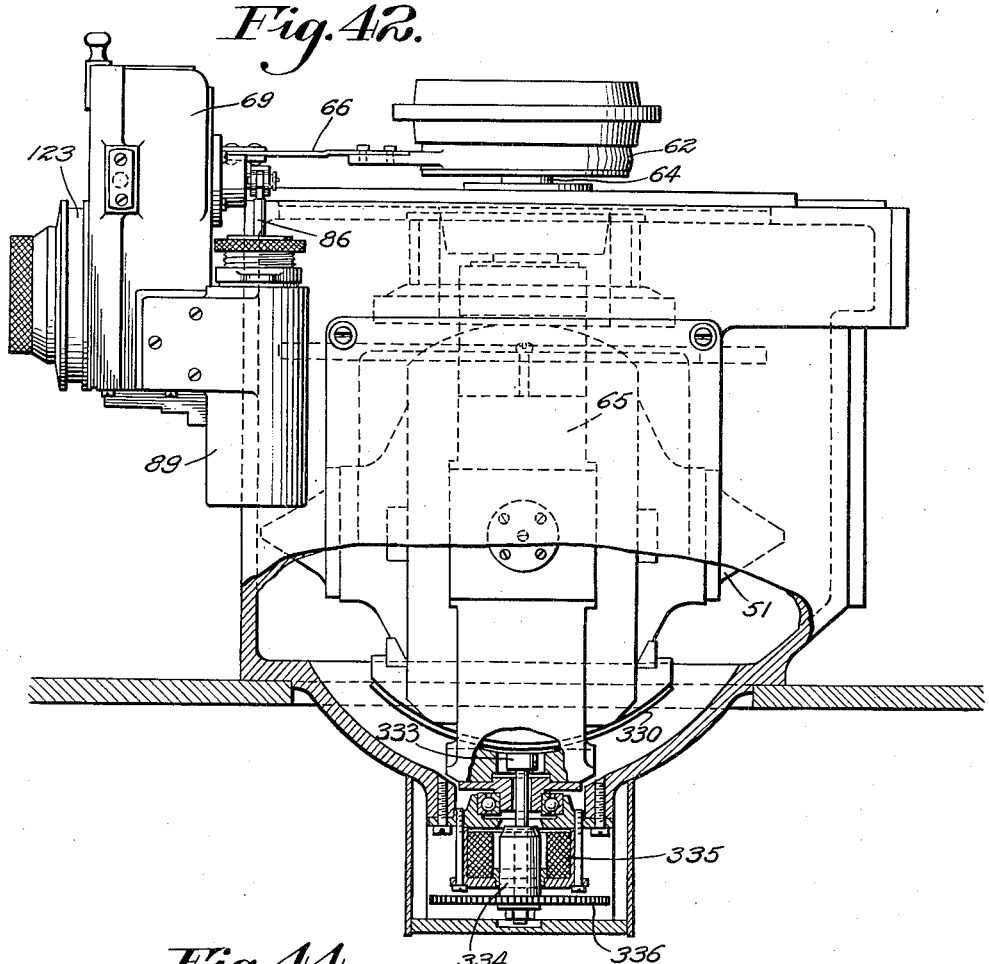
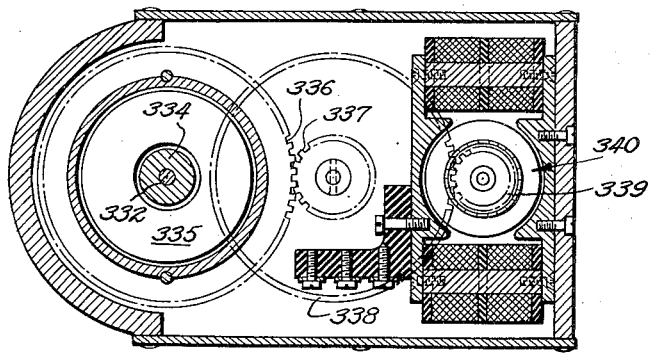
T. H. Barth
INVENTOR
BY W. Glenn Jones
ATTORNEY Oct. 25, 1949.　　　　　T. H. BARTH　　　　　2,485,953
AIRCRAFT CONTROL SYSTEM
Filed April 24, 1940　　　　　　　　　　　　　　21 Sheets-Sheet 21

T. H. Barth
INVENTOR

BY W. Glenn Jones
ATTORNEY

Patented Oct. 25, 1949

2,485,953

UNITED STATES PATENT OFFICE

2,485,953

AIRCRAFT CONTROL SYSTEM

Theodore H. Barth, New York, N. Y., assignor to the United States of America as represented by the Secretary of the Navy Application April 24, 1940, Serial No. 331,479

34 Claims. (Cl. 244—77)

This invention relates to means for automatically controlling an aircraft during flight.

Broadly stated, the object of this invention is to provide a system for automatically controlling an aircraft during flight to increase the precision of bombing operations.

A more specific object is to provide mechanism whereby an aircraft may be controlled in azimuth by the operation of a bomb sight to bring a craft more accurately and expeditiously upon a collision course;

A further object is to provide a novel means for vertically stabilizing a gyro;

Another object is to provide means to render the vertical stabilizing means of a gyro ineffective about the fore-and-aft axis of a plane while executing banked turns;

A still further object is the provision of simple and effective operating units for the control surfaces of an aircraft.

My present invention is illustrated in the accompanying drawings wherein:

Fig. 5 is a section on the line 5—5, Fig. 3;

Fig. 6 is a detail, with parts in section, of the rudder follow-up sector;

Figure 4:
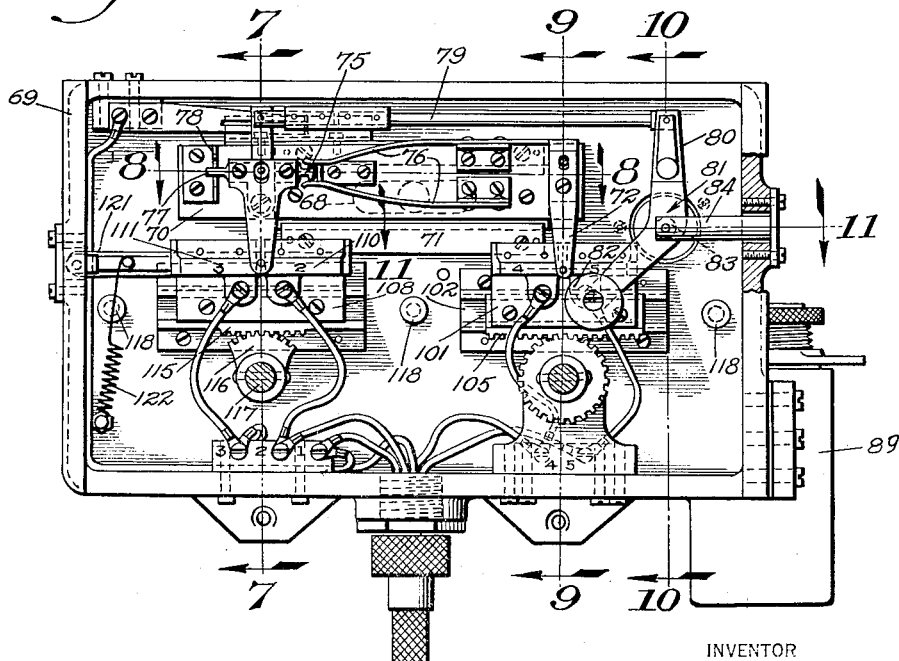
Fig. 4 is a side elevation of the sector control box with side cover removed.
Figure 15:
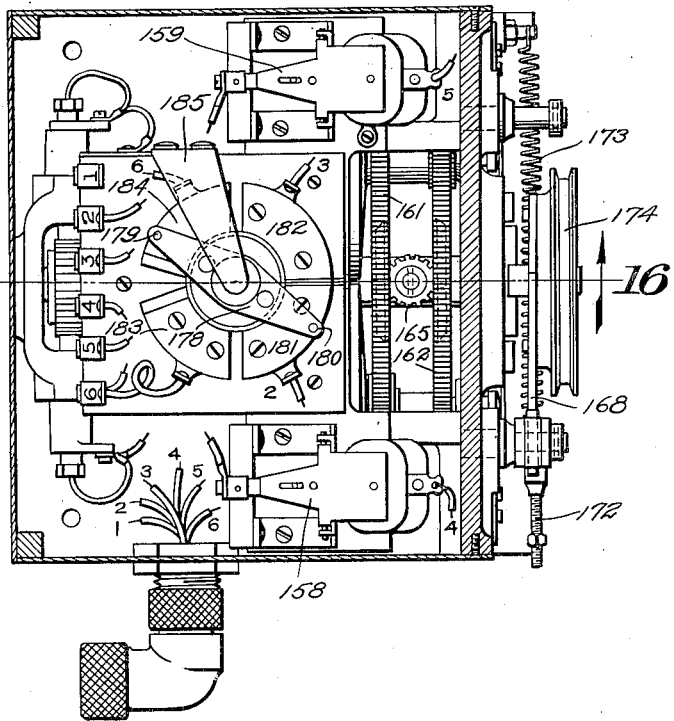
Figure 16:
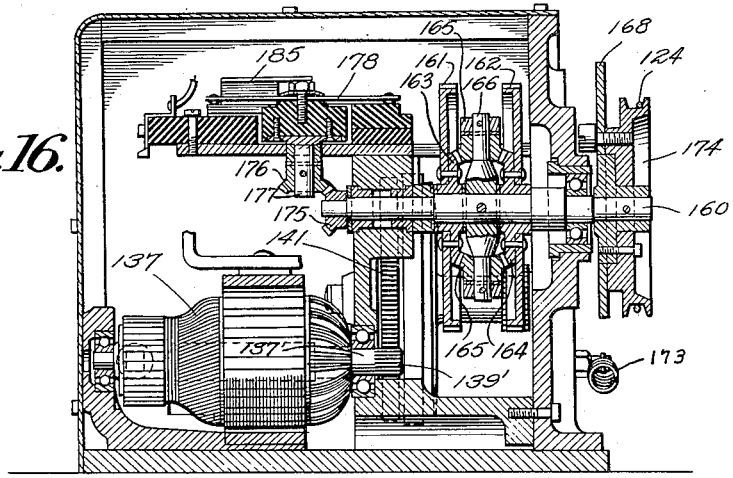
Figure 17:
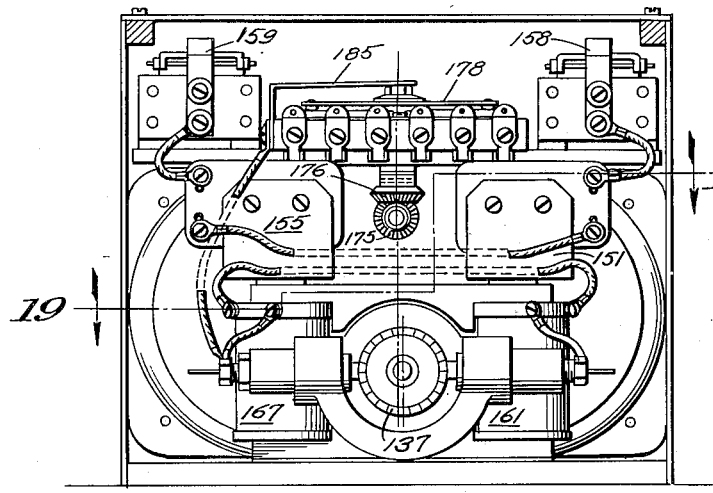
Figure 18:
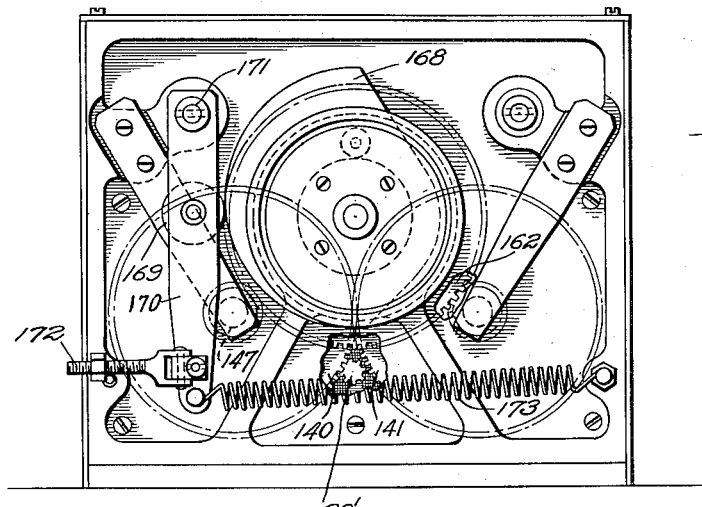
Figure 19:
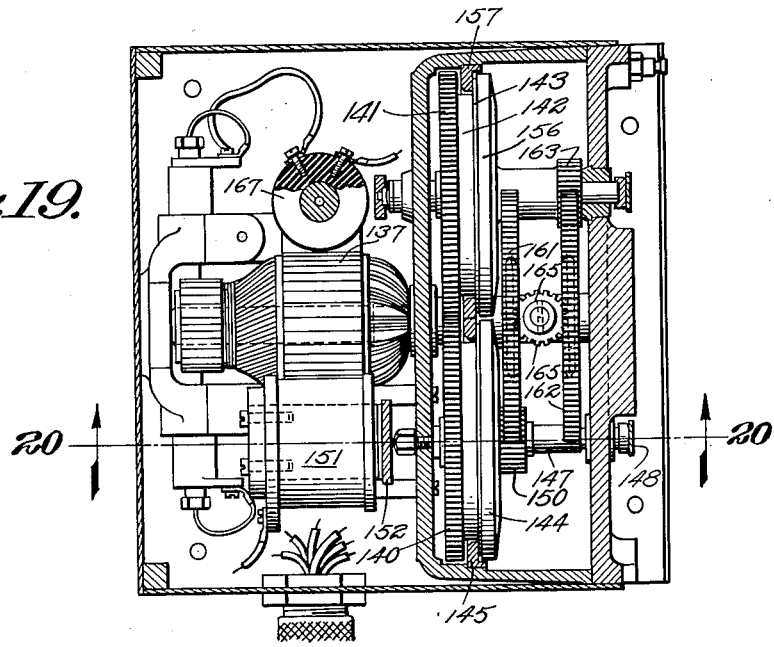
Figure 20:
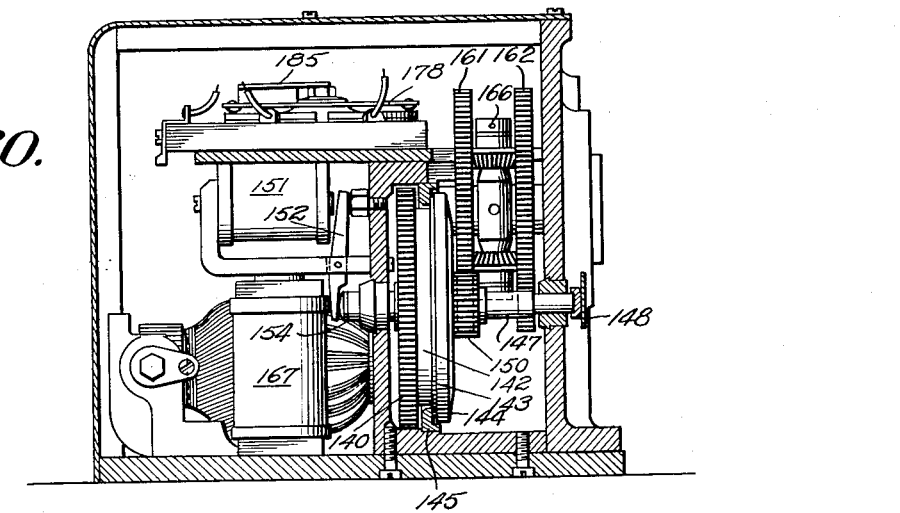
Figure 24:
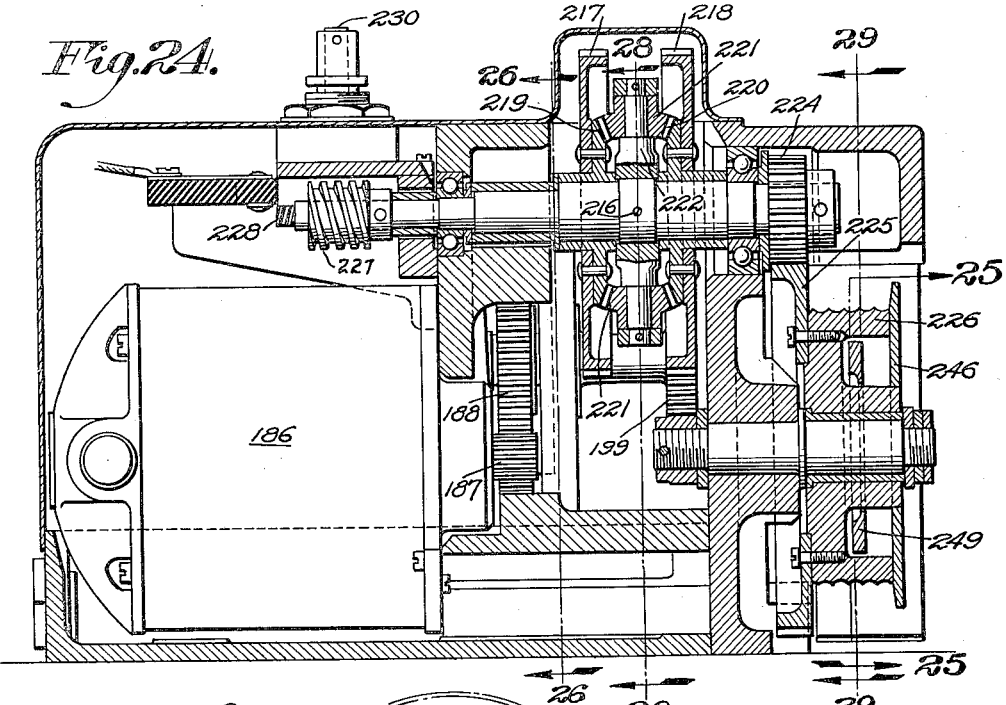
Figure 26:
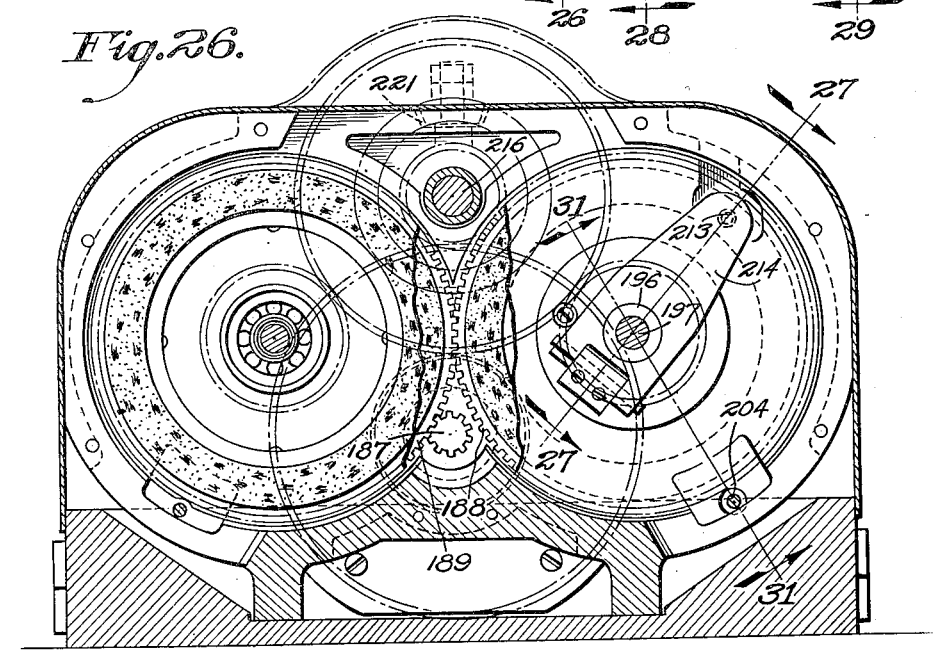
Figure 28:
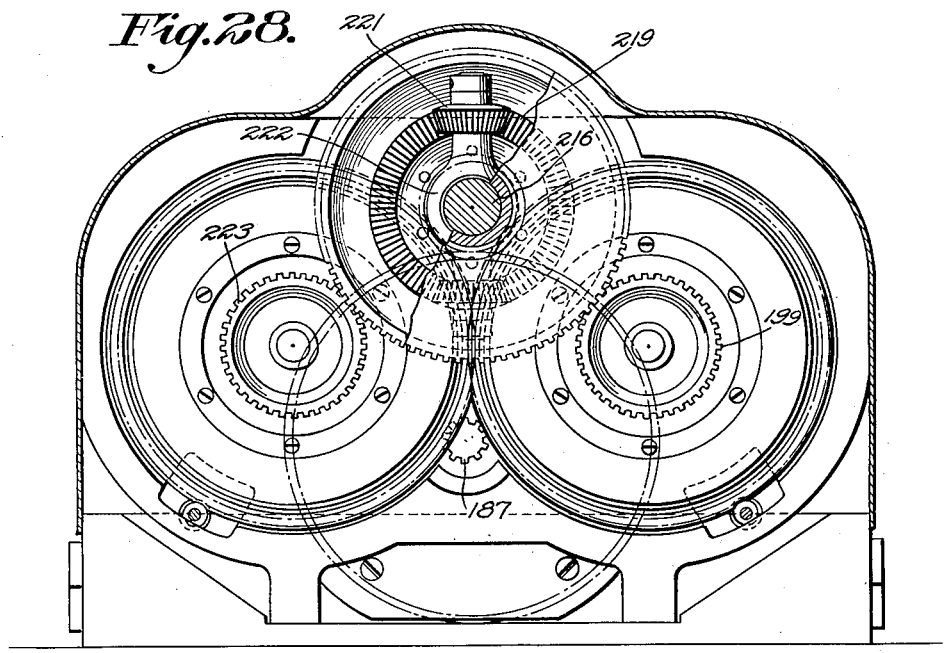
Figure 29:
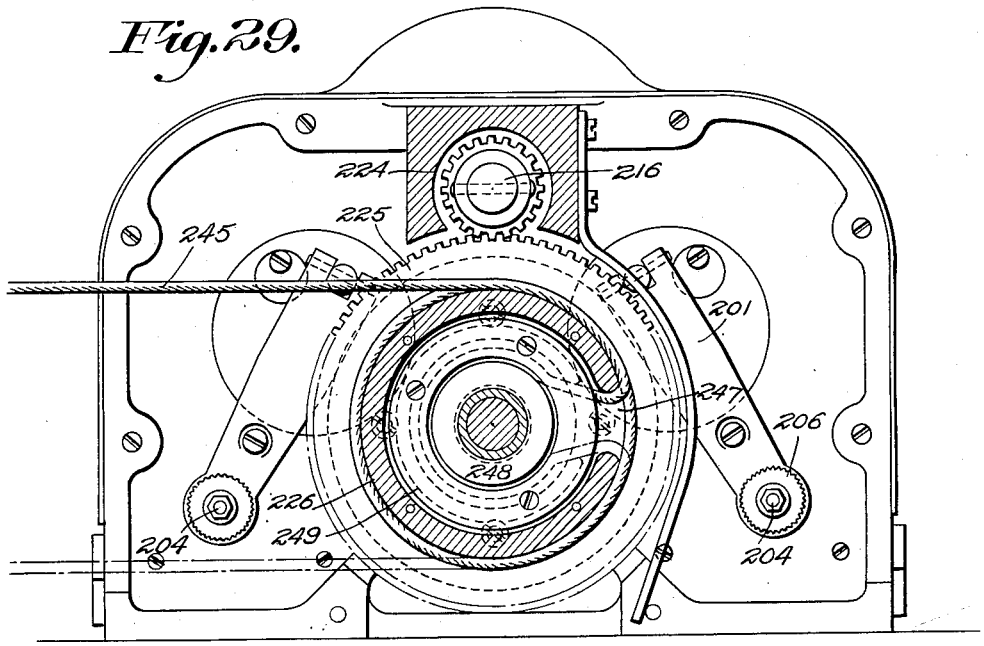
Figure 30:
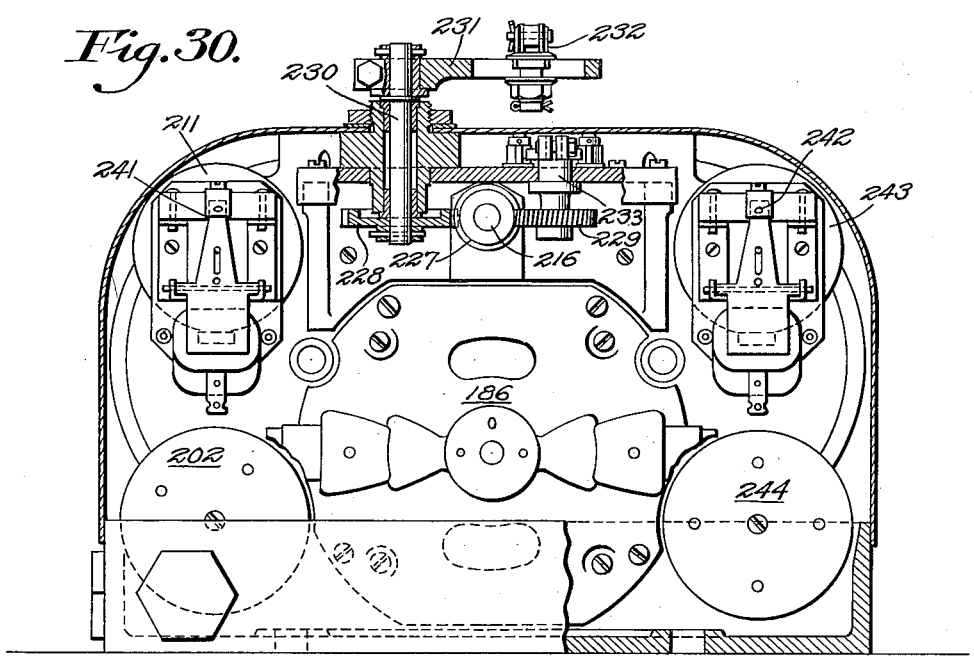
Figure 31:
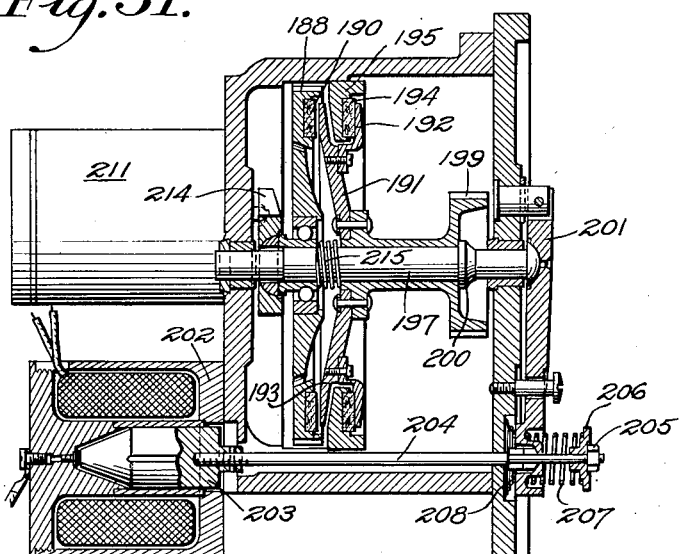
Figure 32:
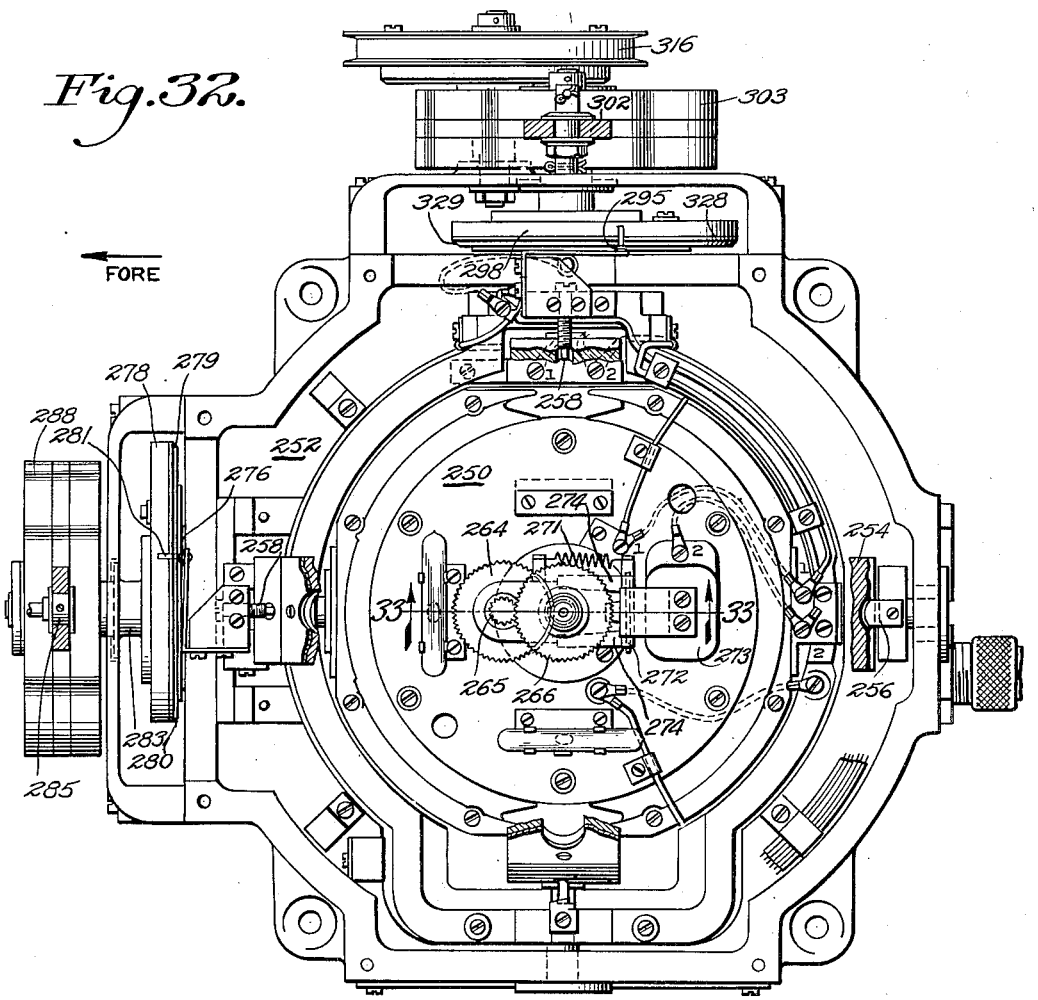
Figure 33:
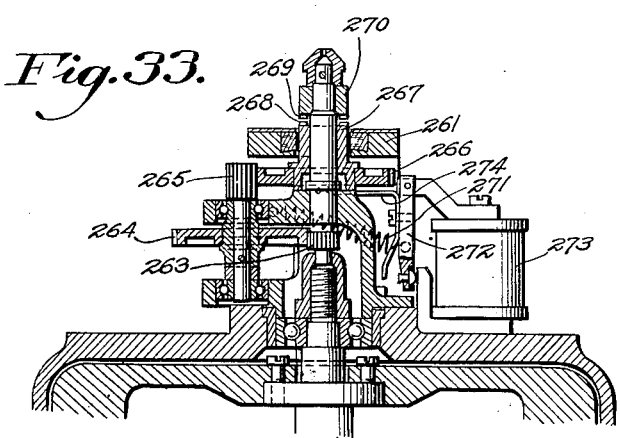
Figure 34:
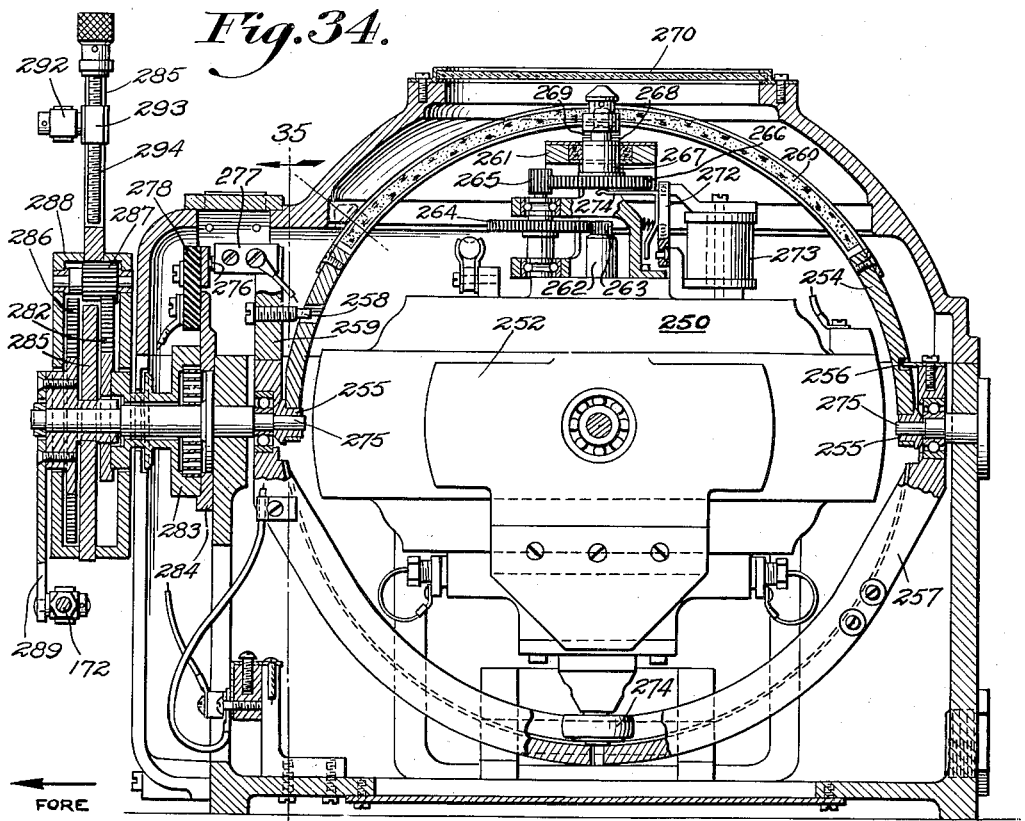
Figure 35:
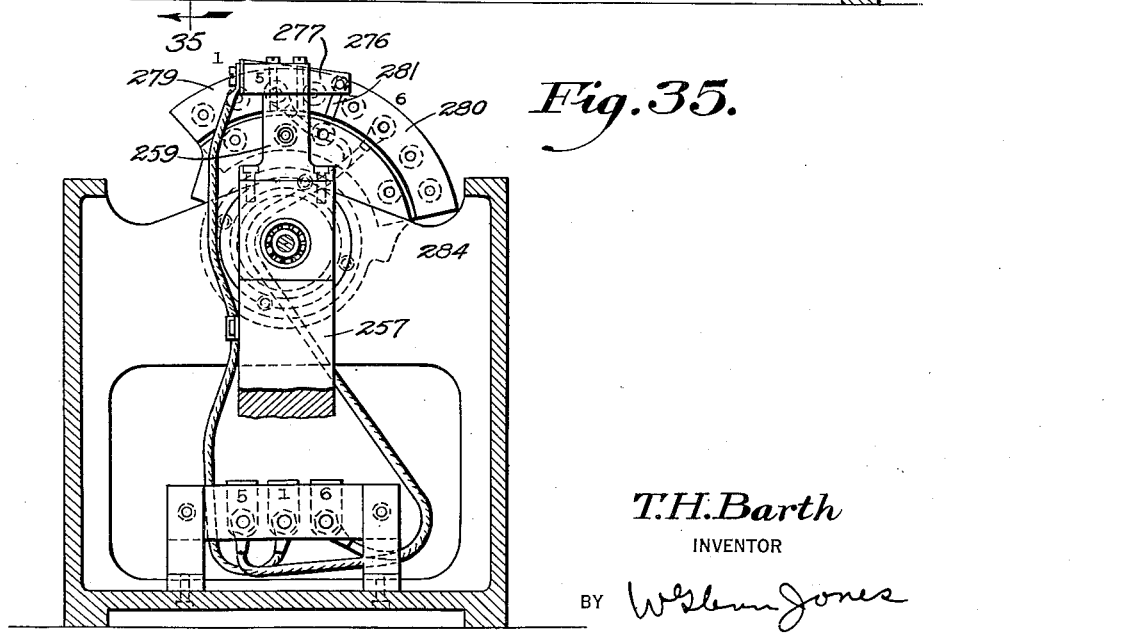
Figure 36:
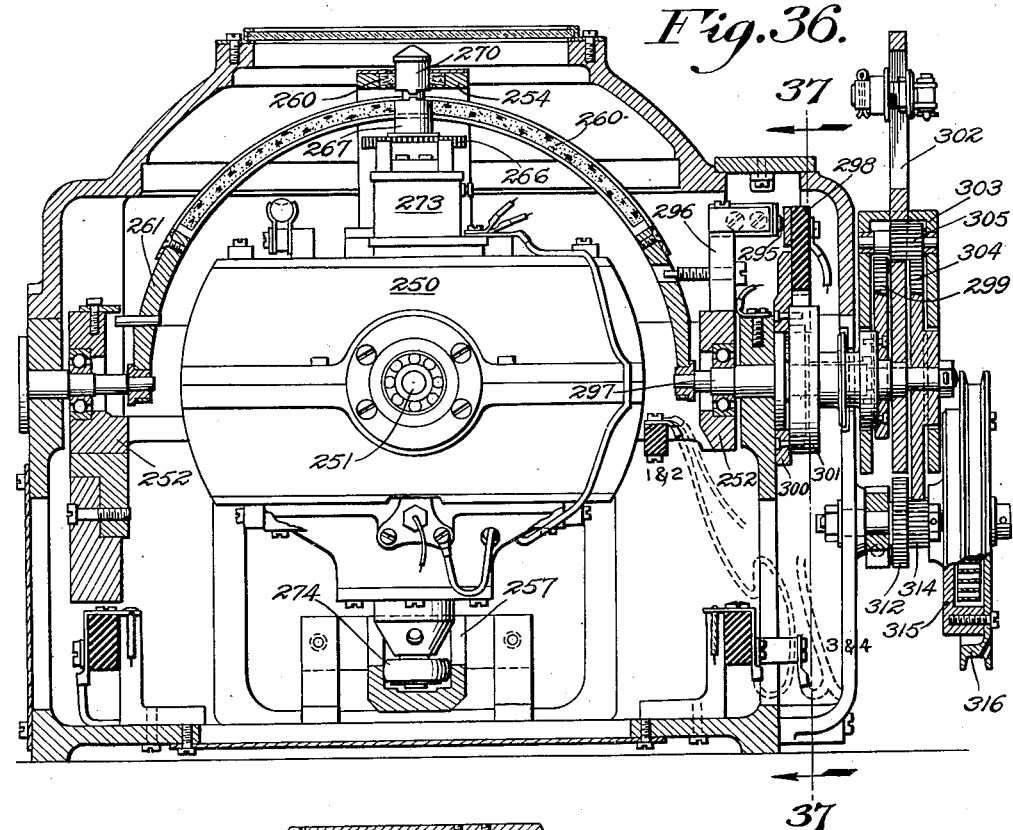
Figure 37:
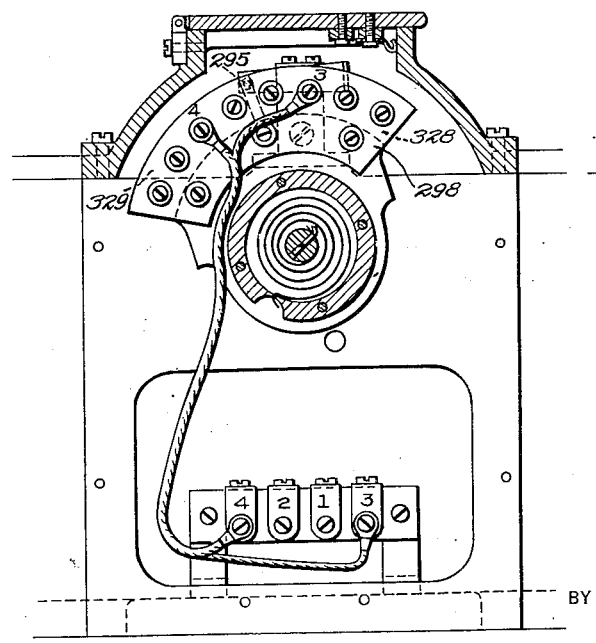
Figures 38, 39:
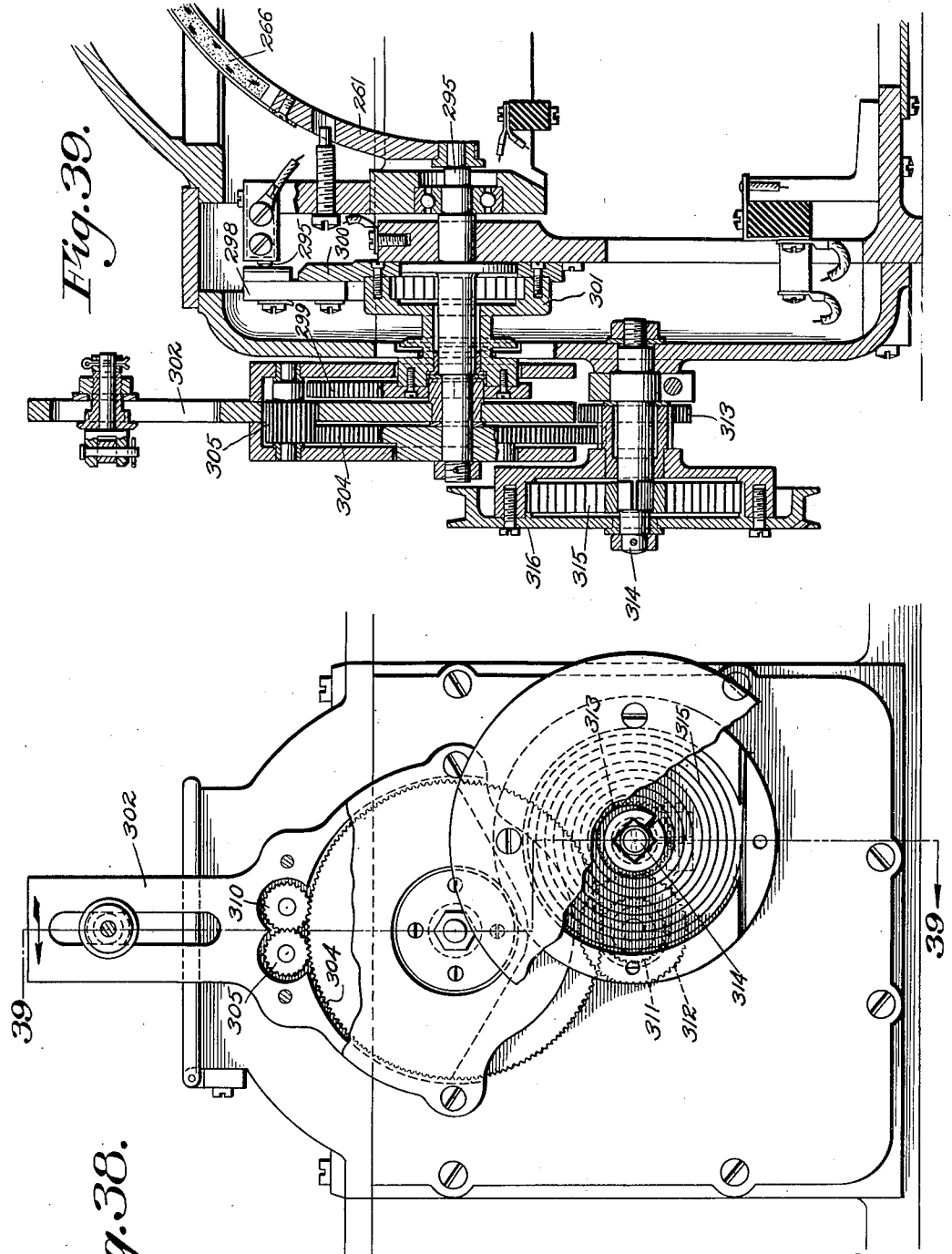
Figure 43:
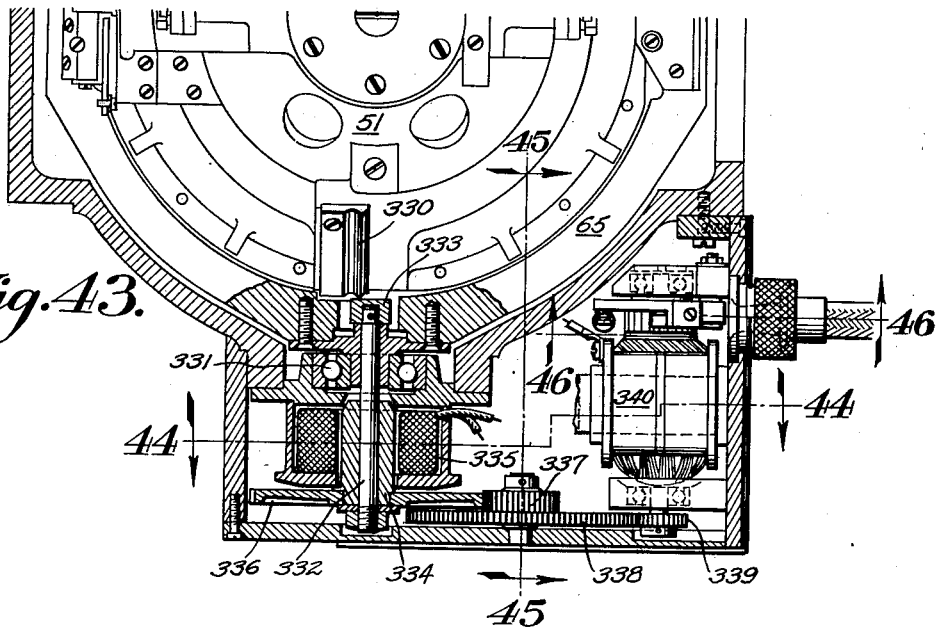
Figure 45:
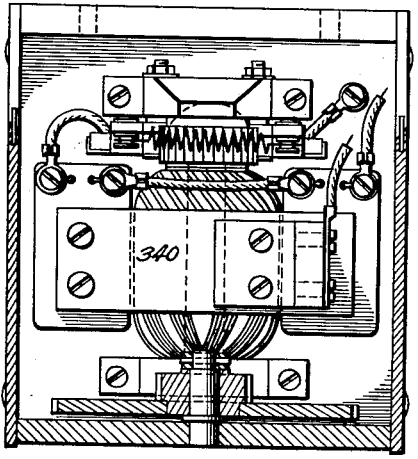
Figure 46:
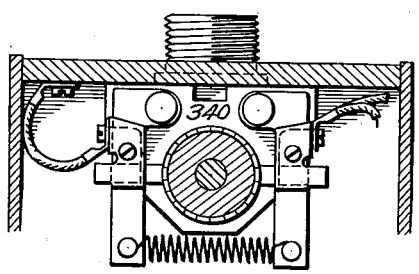

Figs. 7, 9 and 10 are vertical sections taken on the lines 7—7, 9—9 and 10—10, respectively, Fig. 4;

Figs. 8 and 11 are transverse sections on the lines 8—8 and 11—11, respectively, Fig. 4;

Fig. 12 depicts the connection of the rudder control brush in the sector control box to the dashpot;

Figs. 13 and 14 are details of the valve in the dashpot;

Fig. 15 is a top plan view of the bank motor unit;

Fig. 16 is a vertical section on line 16—16, Fig. 15;

Fig. 17 is an elevational view of the mechanism in Fig. 15 as seen from the left in Fig. 15;

Fig. 18 is a corresponding view taken from the right in Fig. 15;

Fig. 19 is a horizontal section on the line 19—19, Fig. 17;

Fig. 20 is a vertical section on line 20—20, Fig. 19;

Figs. 21 and 22 are enlarged details showing two different positions of certain parts in Fig. 20;

Fig. 23 is a top plan view of a servomotor unit with parts of the housing removed;

Fig. 24 is a sectional elevation on the line 24—24, Fig. 23;

Fig. 25 is a detail section on the line 25—25, Fig. 23, depicting the securement of a cable in a drum;

Fig. 26 is a section taken substantially on the line 26—26, Fig. 24, showing certain clutch details in "phantom";

Fig. 27 is a section on line 27—27 of Fig. 26, illustrating details of the clutch mechanism and the solenoid for operating the same;

Fig. 28 is a section on line 28—28, Fig. 24, showing details of the differential gear and associated parts;

Fig. 29 is a section on line 29—29, Fig. 24, illustrating the cable drum and immediately associated driving elements;

Fig. 30 is a left hand end elevation of Fig. 23 with parts broken away;

Fig. 31 is a section through the elements shown in Fig. 27, on line 31—31, Fig. 26;

Fig. 32 is a top plan view of the flight gyro with casing removed;

Fig. 33 is an enlarged sectional detail view of elements associated with the upper end of the flight gyro spin axis, on line 33—33, Fig. 32;

Fig. 34 is a sectional elevation depicting the gyro mounting and associated mechanism, taken substantially on a plane coinciding with that of Fig. 33;

Fig. 35 is a detail elevational view of the aileron contact brush block on the line 35—35, Fig. 34;

Fig. 36 is a sectional view similar to Fig. 34 but taken at right angles to the plane of the latter;

Fig. 37 is a detail section taken on the line 37—37, Fig. 36, showing the elevator contact brush block;

Fig. 38 is an elevational view, with parts broken away, looking from the right hand side of Fig. 36;

Fig. 39 is a sectional detail on line 39—39, Fig. 38;

Fig. 40 shows the operating relation between the elevator control mechanism on the flight gyro and the attitude control;

Fig. 41 is a gear detail taken substantially on the line 41—41, Fig. 40;

Fig. 42 shows the sector control box in end elevation, the connection of the control box to the azimuth gyro, and parts, in section, of the precessing mechanism;

Fig. 43 depicts details of the precessing mechanism, partly in section, at right angles to the plane of Fig. 42;

Fig. 44 is a horizontal section on the line 44—44, Fig. 43;

Figs. 45 and 46 are precessing motor details as viewed from the planes of lines 45—45 and 46—46, respectively, Fig. 43.

The present invention is intended for use in connection with a bomb sight such as that disclosed in my copending application, Serial No. 14,948, filed April 5, 1935, having a bomb sight proper mounted for rotation about a vertical axis and a gyroscope stabilized in azimuth for maintaining the bomb sight proper in a fixed position in azimuth at which it may be set during a bombing run.

Figure 1:
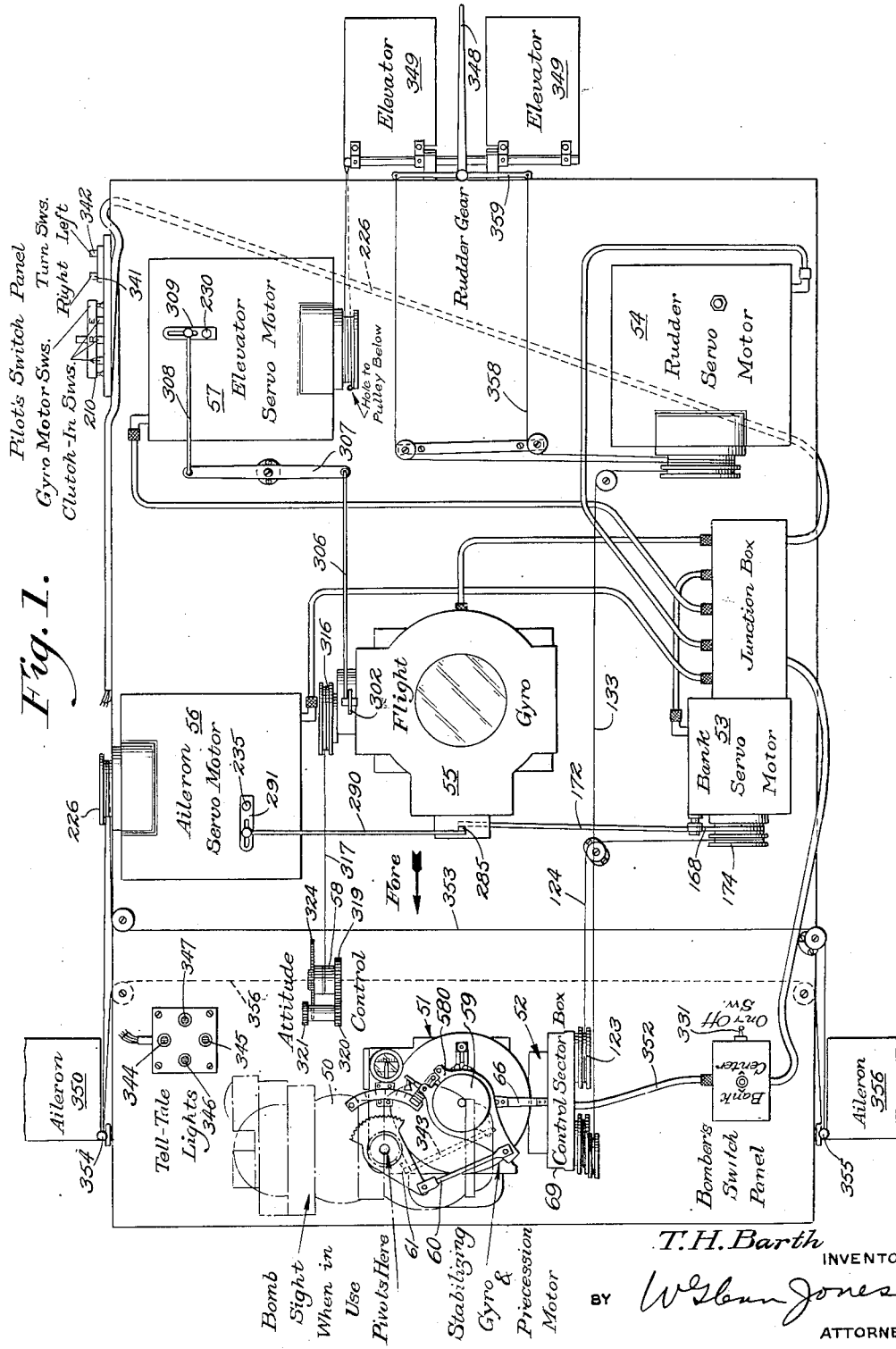
Fig. 1 is a schematic top plan view of the entire system.

The schematic layout of my control system is presented in Fig. 1, which discloses the bomb sight 50 and the associated azimuth gyro 51, the latter of which is connected to a control box 52 whereby the bank servomotor unit 53 and the rudder servomotor unit 54 are energized to control the craft in azimuth. Flight gyro 55 is stabilized with the spin axis vertical and is connected to operate circuit-closing electrical contacts to energize aileron servomotor unit 56 when the craft rolls and elevator servomotor unit 57 when the craft pitches about an athwartship axis. Attitude control 58 is provided to alter the neutral setting of the contacts for energizing the elevator servomotor unit, to give to the craft any desired flight attitude. Suitable follow-ups are provided throughout, as will hereinafter be set forth in detail.

*Rudder and aileron control*

Automatic flight control in azimuth is accomplished by mechanism primarily governed by the azimuth gyro 51. As is fully set forth in my said copending application and shown in Fig. 42 of the present drawings, this is a gyro mounted with its spin axis horizontal and provided with suitable contacts and electrically driven mechanism energized by such contacts (not shown herein), to precess the gyro back to the horizontal upon deviation therefrom. As will be seen in Fig. 1, a primary clutch 580 engages a drum 59 that is stabilized in azimuth by the azimuth gyro and is connected by a link 60 to arm 61 by which the bomb sight 50 is carried and with which the bomb sight is engaged in such a manner that the bomb sight can not move in azimuth except as arm 61 is moved to stabilize the bomb sight in azimuth. A secondary clutch 62 (Fig. 5) engages a secondary drum 63 that is secured to drum 59 which in turn is fixed to the shaft 64 carried by the member 65 that is stabilized in azimuth by the azimuth gyro 51. Secondary clutch arm 66 is connected to secondary clutch 62 at one end and at its other end carries a knob 67 that projects through a slot 68 in control box 69 and is disposed in an opening in the brush carrier 70 slidably mounted in guides 71. Box 69 is fixed to the housing of gyro 51 and is parallel to the fore-and-aft axis of the craft. It is thus evident that the brush carrier 70 will be stabilized by azimuth gyro 51 and that control box 69 will be moved relatively to brush carrier 70 upon deviation of the aircraft in azimuth.

Figure 3:
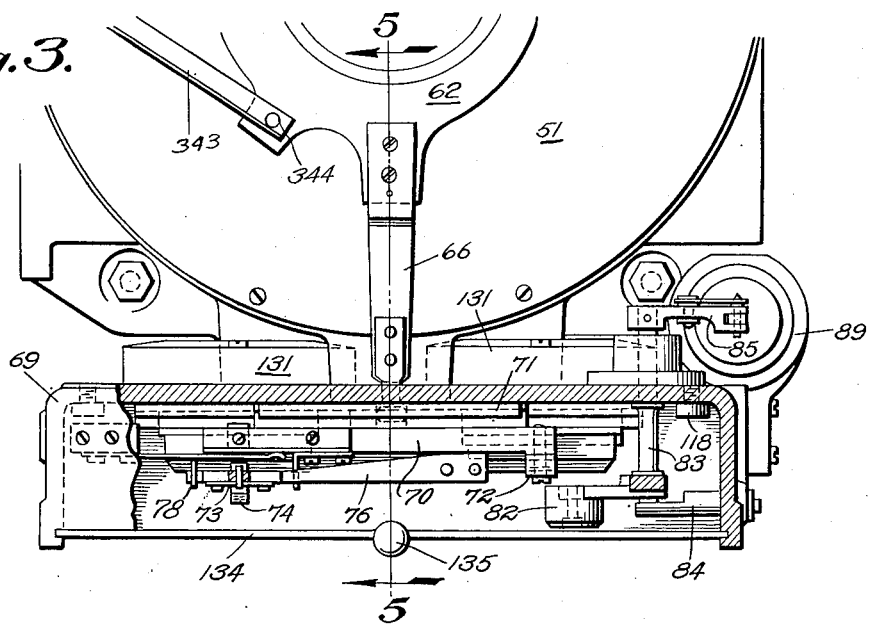
Fig. 3 is a view, with certain parts in horizontal section, of the connection between the azimuth gyro and the sector control box.

Upon brush carrier 70 are mounted a fixed brush 72 and a pivoted brush 73, (Figs. 3 and 4), the latter being mounted for oscillation about a pivot 74 and having an arm 75 extending laterally to be engageable by centering springs 76 and having also an oppositely extending arm 77 to contact the stop 78 and thereby limit the displacement of brush 73 about pivot 74. To the upper end of brush 73 is pivoted one end of a link 79 whereof the other end is pivoted to an arm 80 of bell crank lever 81 which has a counterweight 82 fixed to its other arm and at its elbow is mounted upon a shaft 83 rotatably mounted in box 69. A bearing bracket 84 affords support for the end of shaft 83 upon which bell crank lever 81 is fixed.

Shaft 83 is also fixedly connected to a crank 85 to which is pivoted a piston rod 86 fixed to a piston 87 that is slidable in the liner 88 in dashpot cylinder 89. In the liner 88 (Fig. 12) is a fluid 90, preferably a light oil, that retards the movement of piston 87 in varying degrees depending upon the adjustment of the liner 88. As seen in large scale detail in Figs. 13 and 14, liner 88 has formed in its outer surface adjacent its lower end a plurality of grooves 91 that diminish in cross sectional area upwardly and the coating member 92 between liner 88 and cylinder 89 is of increased internal diameter above a shoulder 93 and consequently by screwing liner 88 up or down in the member 92, the openings through which liquid may flow between 88 and 92 are varied. Communication between the inside and outside of liner 88, above piston 87, is through holes 94. Passages 95 and 96 through piston 87 are covered by spring pressed valves 97 and 98, respectively, to limit the maximum pressure that may be built up against piston 87. For example, if piston 87 is being moved upwardly at a rate that tends to create an excessive pressure the valves 97 will be unseated and fluid will be by-passed from the upper side of the piston to the lower side thereof.

Fixed brush 72 is disposed to be contactable with conducting elements 99 and 100 carried by a slide 101 mounted in a guide 102. The conducting elements 99 and 100 are insulated from each other with an insulating strip 103 between their adjacent ends upon which the contact 104 of brush 72 normally rests in neutral position. It is apparent that, since brush carrier 70 is stabilized through arm 66, relative movement of box 69 will carry slide 101 and bring the brush 72 into circuit closing contact with one or the other of the conducting elements 99 and 100, which are connected to clutch operating solenoids in the banking unit, hereinafter to be described. Slide 101 has on one edge a rack 105 meshed with a gear 106 on a shaft 107 through which the slide is actuated by follow-up mechanism to be described later.

A similar slide 108 is mounted in a guide 109 and carries insulated conducting elements 110 and 111 that may be brought into circuit closing relationship with pivoted brush 73 whereof the contact 112 normally rests on insulating strip 113 in neutral position. The foregoing makes it apparent that when the aircraft changes course the box 69 is moved with respect to stabilized brush carrier 70 and since the link 79 and the dashpot mechanism cooperating therewith are carried by box 69 they will be moved with respect to brush carrier 70 and, due to the resistance to movement of piston 87 through liquid 90, the pivoted brush 73 will be given a much more rapid and much more extensive movement, with respect to the conducting elements 110 and 111, than will the fixed brush 72 with respect to conducting elements 99 and 100. The conducting elements 110 and 111 are each connected by a lead 114 to a respective clutch operating solenoid, depending upon the relative displacement of brush 73, to operate the rudder in one direction or the other, and the purpose of the extra and more rapid displacement of brush 73 with respect to brush 72 is to apply a lead to the rudder before the ailerons, actuated by a unit energized through brush 72 and conducting element 99 or 100, are moved to effect banking. Follow-up motion is applied to slide 108 through rack 115 and gear sector 116 on shaft 117 through mechanism later described in detail. The centering springs 76 are stressed when brush 73 is displaced (Fig. 12) and act upon brush 73 through arm 75 to restore the brush to a centered position.

It will be observed that the follow-up whereby, the rudder control slide 108 is moved to bring the conducting segments 110 and 111 to a neutral position with respect to brush 73 utilizes a gear sector 116 instead of a complete gear. This is to permit manual control by the pilot to move the rudder farther than the automatic control means is intended to move it. It is seen, particularly in Fig. 6, that when the slide 108, whereof a portion is omitted in Fig. 6, contacts a limit stop 118, the gear sector 116 is not meshed with the coacting rack 115. To hold the slide 108 in this limiting position a link 119 is pivoted at one end in an arcuate recess 120 in slide 108 and at its other end to a lever 121 that is pivoted to box 69 and is pulled downwardly by spring 122. It is apparent that this device permits the slide to move freely by extension of spring 122 and yet will hold the slide steady at either of its positions of extreme displacement.

As is depicted in Fig. 9, the follow-up shaft 107 is connected to a drum 123 upon which is wound a follow-up cable 124 (Figs. 1 and 16). This connection is effected through differential gear mechanism comprising a gear 125 fixed to drum 123, gear 126 pinned on shaft 107 and two pinions 127 and 128 that are rotatably mounted in adjusting knob 129 in mesh with each other, the pinion 127 being also meshed with gear 126 and the pinion 128 being also meshed with gear 125. A clock spring 130 is connected at one end to shaft 107 and at its other end to spring blister 131 whereby rotation of shaft 107 stresses the spring 130 and tends always to keep cable 124 taut. It is apparent that if the adjusting knob 129, which is normally held stationary by friction spring 132, remains fixed the rotation of drum 123 by cable 124 will be transmitted through gear 125, pinion 127 and 128 and gear 126 to shaft 107 which will necessarily rotate the gear 106 and hence move the slide 101. The connection of the follow-up is always such that it tends to move insulating strip 103 back to neutral position under brush 72 after slide 101 has been displaced. The function of adjusting knob 129 is to permit the centering of insulating strip 103 under brush 72 without changing the adjustment of cable 124. In like manner and by similar follow-up connections, the shaft 117 is actuated to impart follow-up movement to slide 108, the follow-up being applied through cable 133 (Fig. 1), the blister 136 housing the clock spring connected to shaft 117. The brushes 72 and 73 are connected to a source of current and the return from the operating units energized by contact of brushes 72 and 73 with the respectively cooperating conducting segments 99, 100 and 110, 111 is through ground. Access to the inside of box 69 is had by removing lateral slide cover 134 to which is fixed a knob 135.

Bank servo unit

The current through the circuit closed by contact of brush 72 with one of the conducting elements 99, 100 energizes a bank servo unit now to be described which is shown in detail in Figs. 15 to 22 and is designated in Fig. 1 by the reference numeral 53.

The bank servo unit comprises a motor 137 that is energized from source 138 when switch 139 (Fig. 2) is closed, and operates continuously in one direction. Upon shaft 137' of motor 137 is fixed a pinion 139' that meshes with gears 140 and 141 to drive these gears in opposite directions. The gears 140 and 141 are identical in construction and in their operating connections and hence but one of them need be described, for which specific purpose reference will be had to Figs. 21 and 22, in the former of which the parts are shown in declutched position and in the latter in clutched position.

Upon a face of the gear 140 is an annular rib 142 that is disposed to be engageable with a friction strip 143 (preferably of cork) in clutch plate 144, the friction strip 143 being also engageable with a fixed braking ring 145 disposed between gear 140 and clutch plate 144. A spring 146, shown in the form of a frusto-conical disc, is disposed between gear 140 and clutch plate 144 and acts to keep the rib 142 normally out of contact with friction strip 143. Shaft 147, upon which gear 140 and clutch plate 144 are both rotatable, is longitudinally slidable in its mountings to a limited extent. Leaf spring 148 exerts a thrust upon shaft 147 and, through collar 149 fixed on shaft 147 and pinion 150 in driving engagement with clutch plate 144, normally holds friction strip 143 against ring 145 and prevents rotation of clutch plate 144. However, when brush 72 is brought into contact with that one of conducting elements 99 or 100 that is connected to energize solenoid 151, current flows through the solenoid and the end of pivoted armature 152 adjacent core 153 of solenoid 151 is drawn over toward core 153 which results in the other end of armature 152 exerting a thrust upon sleeve 154 to which gear 140 is fixed and gear 140 is slid along shaft 147 to bring rib 142 into driving engagement with friction strip 143 and to move this strip out of contact with braking ring 145, thus causing clutch plate 144 to rotate with gear 140. It is thus apparent that gear 140 is a clutch driving member and plate 144 is a clutch driven member. The positions of the several parts when clutch plate 144 is being driven are shown in Fig. 22.

Figure 2:
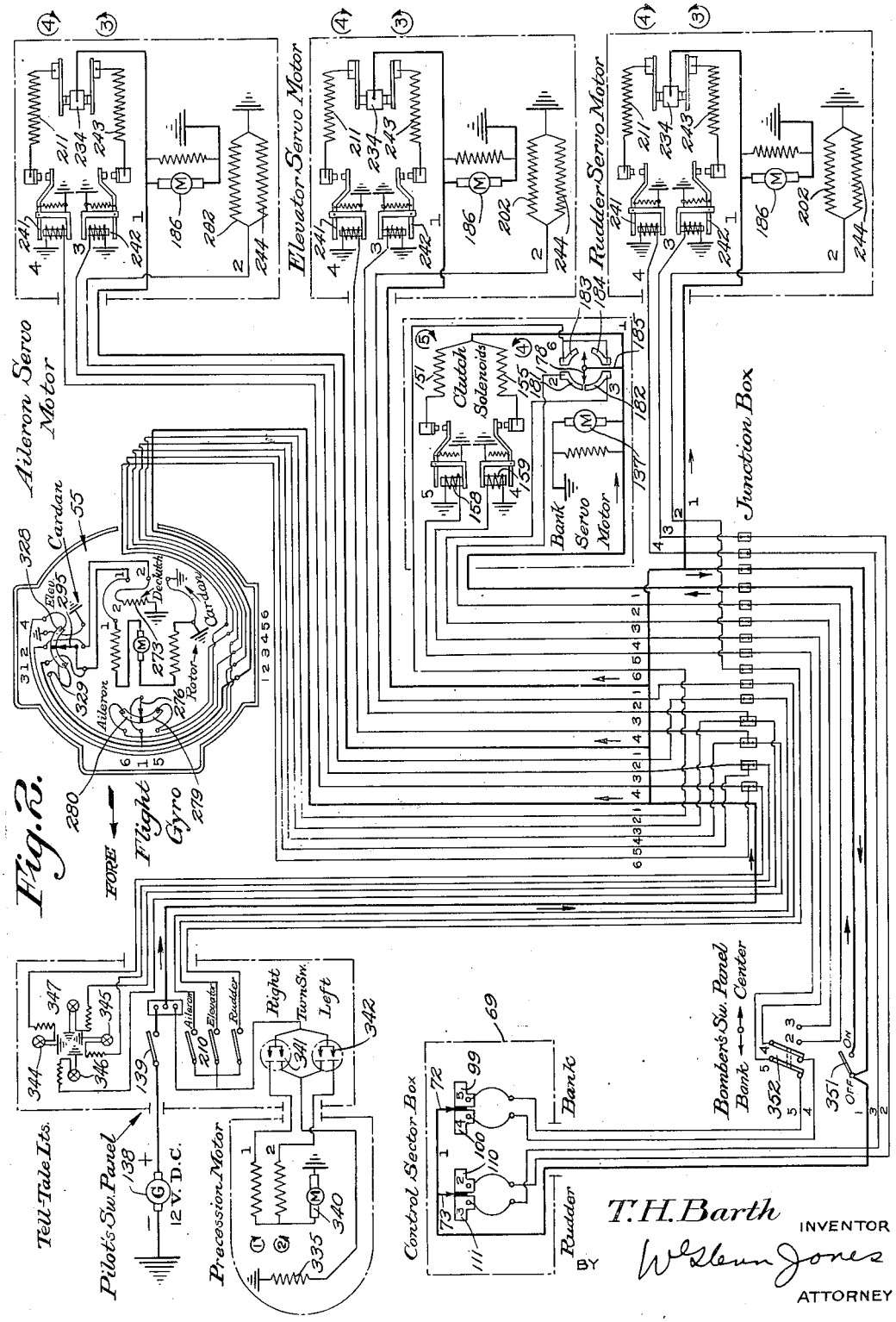
Fig. 2 is a diagram of the electrical connection.

It is seen in Fig. 2 that there are two solenoids 151 and 155 to cause engagement of the gears 140 and 141 with the respective clutch plates 144 and 156 and disengage the clutch plates from the braking rings 145 and 157. Since the gears 140 and 141 rotate in opposite directions, the cooperating clutch plates 144 and 156 will likewise be given opposite rotations.

The solenoids 151 and 155 are not energized directly through the brushes 72 and 73, to avoid the sparking at the contacts that would necessarily result from the relatively heavy operating currents, but the circuits through the solenoids are closed by relays 158 and 159 that receive current directly from brush 72. It is of course understood that when brush 72 closes a circuit through conducting element 91, one of the relays, say 158, is operated and when the circuit is closed through element 100 relay 159 is operated.

As is seen in Fig. 16, crosshead shaft 160 has rotatably mounted upon it two differential side member gears 161 and 162 that have secured to them the beveled pinions 163 and 164 respectively meshed with pinions 165 rotatably mounted on the crosshead 166 that is keyed to crosshead shaft 160. Gear 161 is meshed with the pinion 150 secured to clutch plate 144 while gear 162 is meshed with pinion 163 fixed to clutch plate 156. It is thus apparent that the direction of rotation of shaft 160 depends upon which one of solenoids 151 and 155 is energized to cause the clutch plate controlled thereby to be engaged with its respective driving gear 140 or 141. This in turn depends upon the direction of deviation in azimuth of the aircraft which determines the conducting element 99 or 100 that will be brought into circuit closing contact with brush 72. For economy of space, the solenoids 151 and 155 are mounted on the field coils 167 of motor 137.

To the outer end of crosshead shaft 160 is fixed a cam 168 (Fig. 18) against which bears a cam follower 169 pivoted to a lever 170 intermediate the ends of the lever, one end of the lever being pivoted at 171 and the other end thereof being connected to banking lever 172, the spring 173 being also connected to lever 170 under tension to insure contact of follower 169 upon cam 168 at all times. The lever 172 is connected to move the conducting elements through which are closed the circuits to energize the aileron operating means, hereinafter to be described, to move the ailerons for banking in turns. It is apparent that with the follower 169 normally contacting cam 168 substantially intermediate the termini of the cam, rotation of the cam counter clockwise, as seen in Fig. 18, will result in moving lever 172 to the left while clockwise rotation of cam 168 will permit spring 173 to draw lever 172 toward the right. As above described, the direction of rotation of the cam 168 depends upon which of the conducting elements 99 and 100 is contacted by brush 72.

Fixed to cam 168 concentrically with shaft 160 is a drum 174 upon which is wound the cable 124 to move slide 101 and bring brush 72 into a neutral position with respect to conducting elements 99 and 100 after relative displacement between these elements and brush 72. Here, as in all other operating units of this system, it is necessary that follow-up mechanism be provided so that operation of the respective units will stop upon correction of the deviation that caused such operation. If no follow-up were provided, displacement between the circuit closing parts would persist until the deviation had been completely corrected, which would result in overcorrection and undesirably erratic movement of the craft.

Keyed to the end of shaft 160 opposite that which carries cam 168 is a bevel gear 175 meshed with a like gear 176 secured on the shaft 177. A brush 178 having two contacts 179 and 180 at its opposite ends is fixed to shaft 177 to rotate therewith. The contact 180 is movable over two conducting elements 181 and 182 which are connectible to the relays 158 and 159 through the "Bombers Switch Panel" in Fig. 2 when the switch is moved in the direction of the arrow marked "center." With this connection, the action of the banking unit is to hold the cam 168 in such a position that the aileron control contacts associated with flight gyro 55 are maintained in a neutral position but when the switch in the "Bombers Switch Panel" is thrown in the direction of the arrow "bank" relays 158 and 159 are connected to the conducting elements 99 and 100 and the ailerons are under control of the azimuth gyro 51. The contact 179 is movable over two conducting elements 183 and 184 which are, however, connected to a common lead to render the self-erecting device of the flight gyro, to be described hereafter, ineffective about the fore-and-aft axis when in a banked turn. Current is supplied to brush 178 through a conducting strip 185 electrically connected to brush 178 and to source of current 138.

Servomotor unit

The rudder servo unit 54, the aileron servo unit 56 and the elevator servo unit 57 are all identical in construction and in operation with the sole exception that the cable 133 is used as a follow-up connection to the rudder servomotor, instead of a lever as with the aileron and elevator units. They will, therefore, all be described under the generic term "servo unit" and thereafter the details of connection of the individual units will be set forth.

Referring now principally to Figs. 23 to 31, the servo unit has a motor 186 upon the shaft of which is fixed a pinion 187 meshed with a gear 189 which meshes with gear 188 to cause opposite rotation of these gears (Fig. 26). Again, since the two gears and the parts immediately cooperating therewith are similar to each other, but one will be described in detail. As seen in Figs. 27 and 31, the gear 188 has an annular friction strip 190 set in one face. Adjacent the gear 188 is a clutch plate 191 having a channel periphery with channel walls 192 and 193, the latter being engageable with friction strip 190 and the former being engageable with a friction strip 194 set in a fixed braking annulus 195. Gear 188 is mounted to rotate on a sleeve 196 that is slidable upon a shaft 197 and clutch plate 191 is fixed to a sleeve 198 that is likewise rotatable on shaft 197 and carries a pinion 199 bearing against a collar 200 on the shaft 197. Lever 201 is pivoted at one of its ends adjacent the end of shaft 197 and is drawn inwardly to move shaft 197 toward the left whereby to cause channel wall 192 to engage friction strip 194 and prevent rotation of clutch plate 191.

The necessary pull on lever 201 is exerted by a solenoid 202, to the core 203 of which is secured a stem 204 having on its outer end a nut 205 bearing against a cap 206 to compress spring 207 between the cap 206 and lever 201. Spring 208 is disposed between lever 201 and the fixed wall 209 to move lever 201 outwardly when the solenoid 202 is not energized. Solenoid 202 is energized, along with all other similar solenoids in the servo units 54, 56 and 57, when the switch 210 (Fig. 2) is closed and the clutch plate 191 is thus normally held inactive. However, when the servo unit is to be operated, a relay closes the circuit through solenoid 211 which draws core 212 inwardly and exerts a thrust upon rod 213 which pushes on one end of lever 214 that is pivoted at its other end and bears against sleeve 196 to move gear 188 to the right. This engages friction strip 190 with channel wall 193 of the clutch plate 191 and moves channel wall 192 away from friction strip 194, thereby effecting a driving connection between gear 188 and clutch plate 191. A spring 215 acts to separate gear 188 from clutch plate 191 when solenoid 211 is not energized. Movement of gear 188 through the distance necessary to clear channel wall 192 from friction strip 194 is effected by compressing spring 207.

Rotatably mounted on the crosshead shaft 216 (Fig. 24) are the differential gear side members 217 and 218 to which are fixed the beveled pinions 219 and 220, respectively. Meshed with pinions 219 and 220 are the beveled pinions 221 rotatably mounted on crosshead 222 that is keyed on crosshead shaft 216. The pinion 199 connected to clutch plate 191 is meshed with side member 218 and a pinion 223 fixed to the clutch plate cooperating with gear 189 is meshed with said member 217 and thus, since the respective clutch plates are oppositely rotated, the side members 217 and 218 will be rotated in opposite directions when the pinion respectively meshed with either is driven.

A pinion 224 keyed on crosshead shaft 216 is meshed with a gear 225 fixed to cable drum 226 upon which is wound a cable to operate the airplane control surface to which the particular servo unit is connected. Upon the other end of crosshead shaft 216 is keyed a worm pinion 227 meshed with two worm gears 228 and 229. The worm gear 228 is fixed on a shaft 230 upon which is also fixed the follow-up lever 231 connected to a follow-up link 232. Worm gear 229 drives a shaft 233 upon which is secured a cam 234 disposed between two arms 235 and 236 that respectively bear against spring contacts 237 and 238. After cam 234 has rotated through a predetermined angle it contacts one or the other of the arms 235, 236, moving the arm outwardly, which carries with it the cooperating spring contact 237 or 238 which breaks at 239 or 240 the circuit through the solenoid energized at that time to cause the differential gear to be driven to prevent damage to the system or to the control surfaces of the aircraft. It will be observed that the function of cam 234 and the elements immediately cooperating therewith is to act as a limit switch.

Referring now to Fig. 30, the relays 241 and 242 close the circuits through solenoids 211 and 243 for clutching in the gears 188 and 189 with their respective clutch plates and the solenoids 202 and 244 act to hold the clutch plates against their respective braking strips.

Figs. 25 and 29 depict the manner of securing the cable 245 to the drum 226. The drum is hollow and is provided with a removable closure 246 (Fig. 24). The closure 246 is removed and the bight of the cable is passed through an opening 247 in the drum and around the hub 248, a clamping ring 249 being then inserted and fixed in place by screws after which closure 246 is replaced. The free ends of the cable are then attached to the elements to be operated by the servo unit.

*Flight gyro*

Control of the elevators and ailerons is effected by means of the flight gyro 55, shown in Figs. 32 to 37. This is a gyro 250 mounted on fore-and-aft gudgeons 251 in cardan 252 which is in turn mounted to tilt about an athwartship axis. The spin axis of gyro 250 is vertical and it is maintained in this attitude by the novel mechanism shown in detail in Fig. 33 and also in Fig. 34. Fore-and-aft upper bail 254 has forked ends that seat upon bearings 255 upon which they are retained by a strip 256 extending into a recess in the bail and securely fastened to the lower fore-and-aft bail 257 and also by a screw 258 passing through conducting element holder 259 secured to bail 257. These means for retaining the bail 254 in place are such as to permit limited freedom for rocking on the bearings 255. The bail 254 is slotted throughout its median portion and into each wall of the slot is set a friction strip 260, preferably of cork. Disposed radially inwardly of the bail 254 is athwartship upper bail 261 that is identical in structure and mode of mounting with bail 254.

Spindle 262 of gyro 250 is extended upwardly and has fixed on it a pinion 263 meshed with a larger gear 264 to which is fixed a pinion 265 that drives a gear 266 that is secured on lower roller 267 to drive the roller. It will be seen that there is thus a reduction gear train whereby the roller 267 is driven from gyro spindle 262. The upper face of roller 267 is provided with two teeth 268 that are engageable with teeth 269 on the lower face of upper roller 270. Normally, spring 271 holds pivoted armature 272 away from solenoid 273 and by means of arms 274 fixed on armature 272 and bearing against the lower face of gear 266 maintains the teeth 268 up in driving engagement with teeth 269 so that both the upper and the lower roller are driven from spindle 262. It is seen that lower roller 267 is disposed in the slot in athwartship bail 261 and that upper roller 270 is disposed in the slot in fore-and-aft bail 254.

If, now, the gyro spin axis is displaced, say in a fore-and-aft direction, athwartship bail 261 will, by gravitational force, be caused to tip over into contact with lower roller 267. The frictional engagement between the friction strip 260 and roller 267 will tend to cause the roller to travel along the bail, which will apply a torque that precesses gyro 250 to overcome the deviation of the spindle from the vertical. In a like manner, the fore and aft bail 254 and upper roller 270 function when the deviation is about the fore-and-aft axis. Inasmuch as the clearance between rollers 267, 270 and the respectively coacting friction strips is very small and the normal movement and vibration in an aircraft cause the bails to rock more or less continuously upon their bearings, there is a continuous self-erecting effect exerted upon the gyro spindle. While any one contact of the friction strip 260 with its cooperating roller due to such normal movement and vibration might tend to displace the gyro spindle, the sum of all the frequently occurring contacts of this nature between the rollers and the bails is such that the displacing effect sums up to zero. It is evident that the gyro spindle must be free of the erecting constraint about the fore-and-aft axis when the craft is making a banked turn. This is effected by energizing solenoid 273 from either of the conducting segments 183 or 184 (Fig. 15) when the banking unit 53 is energized to operate the ailerons to effect banking. The passage of current through solenoid 273 draws armature 272 toward the solenoid and this permits the lower roller 267 to drop downwardly so that the teeth 268 and 269 are disengaged and upper roller 270 is not driven. To provide for this operation, the roller 270 is mounted to prevent longitudinal movement while roller 267 is free to move longitudinally to the extent necessary to engage and disengage teeth 268 and 269.

Fixed to the lower side of the casing of gyro 250 is a roller 274 disposed in a channel formed in lower bail 257 which is pivoted on the same axes 275 as are the bearings 255 for upper bail 254 and hence the lower bail 257 is stabilized about the fore-and-aft axis by the gyro 250. An electrically conductive brush 276 is attached to insulating member 277 fixed to member 259 mounted on lower bail 257 and is thus also stabilized about the fore-and-aft axis. Adjacent to and cooperating with brush 276 is an insulating member 278 upon which are fixed two conducting elements 279 and 280 separated by a non-conducting spacer 281. Member 278 is connected to a gear sector 282 through members 283 and 284 that are rotatable upon shaft 275.

Aileron follow-up lever 285 is mounted adjacent gear sector 282 to be rotatable about shaft 275 and adjacent lever 285 is mounted gear 286 that is also rotatable about the same shaft. The radius of gear 286 is the same as that of gear sector 282 and meshed with the latter is a pinion 287 that is meshed with a like pinion which, however, is meshed with gear 286 instead of gear sector 282. Pinion 287 and the pinion meshing therewith are rotatably mounted in a frame 288 through which lever 285 extends. The arrangement of pinion 287 and the other pinion meshed therewith is similar to that shown in detail in Fig. 41. Banking lever 289 is fixed to gear 286. The connection of follow-up lever 285 and banking lever 289 are shown in Fig. 1 wherein the link 172 is indicated as connected to lever 289 and aileron follow-up link 290 is depicted as connected to follow-up lever 285 and to a lever 291 secured on follow-up shaft 230 of the aileron servo unit 56.

The brush 276 normally contacts insulating spacer 281 but if the craft rolls about its fore-and-aft axis the conducting elements 279 and 280 will be moved with respect to brush 276 so that a circuit will be closed through brush 276 and that conducting element 279 or 280 in contact therewith. The current flow thus made possible will energize that one of the solenoids 211 and 243 (Fig. 30) of the aileron servo unit 56 to actuate the ailerons to restore the original transverse attitude of the craft. When the aileron servomotor is operatively coupled to its crosshead shaft 216 to operate the ailerons, the follow-up shaft 230 is likewise actuated and, through link 290, acts upon follow-up lever 285 in such direction that gear sector 282 is differentially driven through pinion 287 and the pinion cooperating therewith to move the members 283, 284 and 278 to set insulating spacer 281 again in contact with brush 276 so that the mechanism is prepared to correct subsequent transverse disturbance of the craft.

Link 290 (Figs. 1 and 34) is connected at 292 to a traveling nut 293 on screw 294 mounted in follow-up lever 285 to make possible the adjustment of the degree of angular movement transmitted to member 278 by any given longitudinal movement of link 290. It will be seen that movement of banking lever 289 by cam 168 (Fig. 18) through link 172 is differentially transmitted to the member 278 to shift the position of insulating spacer 281, thus closing a circuit through brush 276 and one of the conducting elements 279 or 280 to actuate the aileron operating mechanism 56 and move the ailerons to the extent necessary to execute a banked turn. It is likewise obvious that the upper bail 254 and roller 270 must be rendered inoperative to permit the aircraft to roll about its longitudinal axis during a banked turn and this is effected, as above described, by means of solenoid 273 and the elements cooperating therewith.

The mechanism for controlling pitch of the craft is very similar to that described whereby the ailerons are controlled. A conducting brush 295 is mounted, by means of insulating member 296, upon cardan 252 above the shaft 297 upon which the cardan tilts and thus brush 295 is stabilized by gyro 250 about the athwartship axis. Insulating member 298 is connected to gear sector 299 by means of members 300 and 301, to the last of which the sector 299 is secured. Elevator follow-up lever 302 is disposed through frame 303 to lie between gear sector 299 and gear 304 which is differentially connected to gear sector 299 through pinion 305 and a pinion meshed therewith and with gear sector 299, both pinions being mounted in frame 303. Elevator follow-up lever 302 is connected by a link 306 to lever 307 and thence by link 308 to follow-up lever 309 fixed on follow-up shaft 230 of the elevator servo unit 57 (Fig. 1).

It is frequently desirable to set the elevators of an aircraft at some particular position to control the attitude of the craft for climb or glide. This is effected by the means shown in Figs. 38 to 40. Fig. 38 illustrates, in side elevation, the elevator follow-up lever 302, the pinion 305 meshed with gear 304 and a pinion 310 meshed with pinion 305 and with gear sector 299 but not with gear 304, as shown in detail in Fig. 41. Meshed with gear 304 is a pinion 311 fixed on the same shaft with a gear 312 that meshes with a pinion 313 on shaft 314 to which is secured one end of a clock spring 315 whereof the other end is fixed to drum 316. Wound upon drum 316 is one end of a cable 317 whereof the other end is wound upon a drum 318 of the attitude control device designated generally by the character 58 in Fig. 1. Drum 318 is fixed to a gear 319 meshed with a pinion 320 connected to be rotated by an adjusting knob 321. Fixed on the same shaft 322 with drum 318 is a pinion 323 meshed with a gear sector 324 mounted to rotate a shaft 325 carrying an index 326 movable over a fixed scale 327. It is apparent that rotation of knob 321 rotates drum 318 and either winds cable 317 thereon or slacks off the said cable so that clock spring 315 in drum 316 can rotate the drum to take up the slack in cable 317. Consideration of Fig. 39 shows that any rotation of drum 316 is transmitted from pinion 313 to gear 304 and thence differentially to actuate the member 298 and so change the neutral position of the conducting segments 328 and 329 with respect to brush 295. This will result in operation of the elevators until the craft has assumed such position that conducting elements 328 and 329 are neutral with respect to brush 295.

*Azimuth precession device*

It is frequently desirable that the course of an aircraft be changed without taking complete manual control of the craft. I have, therefore, provided the mechanism shown in Figs. 42 to 46 whereby the craft may be turned in azimuth by means of the automatic control.

As is shown in Figs. 42 and 43, azimuth gyro 51 has a rib 330 fixed on the housing in the plane of the spin axis substantially midway between the tilting supports for the housing. The support 65 in which gyro 51 is tiltably suspended is rotatable in bearings 331. Extending through the axis of bearings 331 is a stem 332 upon the upper end of which is fixed a roller 333 that may be brought into frictional driving engagement with rib 330, the center of roller 333 being offset from the rib 330. Core 334 of solenoid 335 is fixed to stem 332 whereby when solenoid 335 is energized the core 334 will be drawn upwardly and move roller 333 into driving engagement with rib 330. Fixed on core 334 is a gear 336 meshed with pinion 337 that is in driving connection with a gear 338 meshed with pinion 339 on the armature shaft of a motor 340. Energization of motor 340 applies to rib 330, through the speed reducing gear train next above described, a torque in the plane of the spin axis of gyro 51 which results in precession of the spin axis at right angles thereto or in azimuth.

Motor 340 is reversible and is controlled by switches 341 and 342 (Fig. 2) in the "Pilot's Switch Panel" (Fig. 1). Precession of gyro 51 is transmitted through secondary clutch 62 and secondary clutch arm 66 to the control unit 52 where brush carrier 70 is shifted with respect to slides 101 and 108 which, as above described, results in energizing the rudder and aileron controlling units to change the course of the craft until the control unit 52 is so positioned that brushes 72 and 73 are again in neutral position.

Change in azimuth under the control of the bomber is effected by disengaging secondary clutch 62 from secondary clutch drum 63 so that the secondary clutch is free to move independently of the azimuth gyro. The bomber then rotates bomb sight 50 in azimuth to the desired course and this motion is transmitted through secondary link 343 (Fig. 1) having one end connected to be moved by rotation of the bomb sight and the other end connected to secondary clutch by a pivot through the opening in apertured boss 344 (Fig 3) on secondary clutch 62. The movement of the bomb sight is thus transmitted to rotate clutch 62 and arm 66 to actuate control unit 52 to energize the rudder and banking control units and the turning of the craft is effected. When the craft is on the course defined by the line of sight of bomb sight 50 secondary clutch 62 is again engaged and automatic flight control is resumed.

Operation

Automatic flight control is begun by the pilot closing switch 139 (Fig. 2) which energizes the motors 186 of the servo units, motor 137 of the banking unit 53 and the flight gyro 55. The braking solenoids 202 and 244 of the several servo units are not energized at first and consequently the servo units cannot operate since springs 207 do not offer sufficient resistance to longitudinal movement of the clutch plates to effect driving contact with friction strips 190 in the gears 188 and 189 and, therefore, the rudder 348, elevators 349 and ailerons 350 will not be operated. Also, if the course and attitude of the craft do not correspond to the settings of azimuth gyro 51 and flight gyro 55, a relay 241 or 242 of the servo unit that should be operated to correct the deviation will not be energized.

Tell-tale lights 344 and 345 are preferably disposed on an athwartship line and one or the other will be lighted if the craft is not transversely level and likewise tell-tale lights 346 and 347 are preferably disposed on a fore-and-aft line and one of them will be lighted if the attitude of the craft does not correspond with the settings of the conducting elements 328 and 329 with respect to brush 295 that controls the elevators 349. If the tell-tale lights 344 to 347 are not disposed as above described they are labelled to indicate the unit to which they are connected. The pilot observes the tell-tale lights and controls the craft until all the tell-tale lights are either extinguished or all are flickering on and off which indicates that the spin axis of flight gyro 55 is vertical or substantially so. He then closes switch 210 (Fig. 2) to energize the braking solenoids 202 and 244 of elevator servo unit 57, rudder servo unit 54 and aileron servo unit 56. It is important that the spin axis of flight gyro 55 be substantially vertical before the braking solenoids are energized to hold the clutch plates of the servo units with sufficient firmness to effect driving contact with the respective gears 188 or 189, otherwise the control surfaces would be energized and might cause a movement that would throw the craft into a dangerous attitude. After the plane is brought upon the proper course the bomber engages secondary clutch 62 and throws the switch 351 (Fig. 2) to the "On" position to energize the motor 137 of the banking unit 53 and supply current to brush 178 of the banking unit. He then sets switch 352 in the position shown in Fig. 2 to connect conducting segments 99 and 100 and brush 72, all in control box 69, in circuit with the banking unit and the craft is then under full automatic control.

If now the plane should nose down due to bumpy air conditions, conducting element 328 will be moved into contract with brush 295 and the circuit will be closed through that one of the relays 241 and 242 of the elevator servo unit 57 that will operate to raise the elevators 349. As shown in Fig. 2, conducting element 328 is connected to relay 241 in elevator servo unit 57. As soon as the crosshead shaft 216 of the servo unit begins to rotate the drum 226 to change the position of the elevators, it also rotates follow-up shaft 230 and moves follow-up lever 309 to shift follow-up lever 302 on flight gyro 55, through the system 306, 307, 308 to bring the neutral space between conducting elements 329 and 328 again under brush 295. It will be seen by an examination of Fig. 24 that the follow-up shaft 230 is driven through a worm gear and therefore the follow-up movement is slow although continuous and is so timed as to effect a cessation of driving of crosshead shaft 216 prior to the completion of correcting the deviation of the craft from the desired flight attitude. Return of the craft toward its original attitude then closes the circuit through the other conducting element and energizes the servo unit to return the control surface of the craft to the position it had prior to the deviation.

If the displacement of the craft be in the nature of a roll about its longitudinal axis, conducting elements 279 and 280 are displaced with respect to brush 276 so that a circuit is closed through one or the other of the relays 241 and 242 of aileron servo unit 56 whereby the ailerons are actuated to restore the craft to a level attitude transversely. The operation of the follow-up is identical with that before described. The drum 226 of aileron servo unit 56 is connected to the ailerons by a cable 353 that is wound several times around the drum 226 and has its ends connected to the respective aileron operating levers 354 and 355. The aileron operating levers on the undersides of the ailerons (not shown) are connected together by a cable 356 in the conventional manner. If the craft makes an undesired change in course, the brushes 72 and 73 in control unit 52 are held by azimuth gyro 51 and the conducting elements 99, 100 and 110, 111 respectively cooperating with the said brushes are brought into circuit closing relation with the said brushes to operate rudder servo unit 54 and banking unit 53. Rudder servo unit 54 is connected to the rudder yoke 357 by a cable 358, but instead of a lever follow-up motion is transmitted by cable 133 as above set forth in connection with control box unit 52.

At the same time the rudder servo unit 54 is operated, the banking unit 53 is likewise set into operation to drive cam 168 and thereby move the conducting elements 279 and 280 that are connected to close the circuit through the aileron servo unit and move the ailerons 350 to apply the proper bank. As above described, the contact 179 of brush 178 closes the circuit through solenoid 273 on flight gyro 55 to break the driving connection between upper roller 270 and lower roller 267 and so prevent the self-erecting mechanism on flight gyro 55 from having any effect about the fore-and-aft axis during the banked turn.

When switch 352 (Fig. 2) is moved to the "center" position the conducting segments 181 and 182 (Fig. 15) are connected to the relays 158 and 159 of the banking unit and hence the unit is energized to move contact 180 to the neutral position between conducting elements 181 and 182, which corresponds to a neutral position of the cam 168. So long as the switch 352 remains in the center position the circuit elements in control box unit 52 have no effect to impart banking displacement to the ailerons.

I claim:

1. A system for controlling the flight of an aircraft having ailerons, a rudder and elevators, comprising a sighting device rotatable in azimuth, a gyro mounted for tilting about two mutually perpendicular axes and stabilized in azimuth; means to cause the gyro to precess including a friction disk movable into driving engagement with the mounting of said gyro, a reversible motor connected to drive said disk, and means to energize said motor in the desired direction and move said disk into driving engagement with said mounting; a control box fixed to said craft, a first slide and a second slide displaceably mounted in said box, two separate conducting elements on each slide, a brush carrier to be contactible with said conducting elements on said second slide, follow-up elements connected to move said second slide to a position to make the conducting elements thereon neutral with respect to said brush, a pivoted brush on said brush carrier disposed to be contactible with the conducting elements on said first slide, means to center said pivoted brush, means to swing said pivoted brush on its pivot upon displacement of said carrier, follow-up elements connected to move said first slide to make the conducting elements thereon neutral with respect to said pivoted brush, means connecting said brush carrier to said gyro to displace said carrier upon deviation of said aircraft in azimuth; a motor, reversing gear means drivable by said motor connected to operate said rudder, means electrically connecting said reversing gear to the conducting elements on said first slide to effect drive of said reversing gear in the direction determined by the conducting element in contact with said pivoted brush, means actuated by said motor to operate the follow-up on said first slide, a second motor connected to operate said ailerons, means controlled by the conducting elements on said second slide to energize said second motor proportionally to the degree of displacement of said rudder and in a direction to effect the proper degree of bank, means actuated by said second motor to operate the follow-up elements connected to said second slide, and means connecting said sighting device to displace said slides upon movement of said device in azimuth.

2. A system for controlling the flight of an aircraft having ailerons, a rudder and elevators, comprising a gyro mounted for tilting about two mutually perpendicular axes and stabilized in azimuth; means to cause the gyro to precess including a friction disk movable into driving engagement with the mounting of said gyro, a reversible motor connected to drive said disk, and means to energize said motor in the desired direction and move said disk into driving engagement with said mounting; a control box fixed to said craft, a first slide and a second slide displaceably mounted in said box, two separate conducting elements on each slide, a brush carrier slidably mounted in said box, a fixed brush mounted on said carrier to be contactible with said conducting elements on said second slide, follow-up elements connected to move said second slide to a position to make the conducting elements thereon neutral with respect to said brush, a pivoted brush on said brush carrier disposed to be contactible with the conducting elements on said first slide, means to center said pivoted brush, means to swing said pivoted brush on its pivot upon displacement of said carrier, follow-up elements connected to move said first slide to make the conducting elements thereon neutral with respect to said pivoted brush, means connecting said brush carrier to said gyro to displace said carrier upon deviation of said aircraft in azimuth; a motor, reversing gear means drivable by said motor connected to operate said rudder, means electrically connecting said reversing gear to the conducting elements on said first slide to effect drive of said reversing gear in the direction determined by the conducting element in contact with said pivoted brush, means actuated by said motor to operate the follow-up on said first slide, a second motor connected to operate said ailerons, means controlled by the conducting elements on said second slide to energize said second motor proportionally to the degree of displacement of said rudder and in a direction to effect the proper degree of bank, and means actuated by said second motor to operate the follow-up elements connected to said second slide.

3. A system for controlling the flight of an aircraft having ailerons, a rudder and elevators, comprising a sighting device rotatable in azimuth, a gyro mounted for tilting about two mutually perpendicular axes and stabilized in azimuth; means to cause the gyro to precess selectively in either direction in azimuth; a control box fixed on said craft, a brush carrier slidably mounted in said box, a brush pivoted intermediate its ends on said carrier and having a contact at one end and arm extending laterally from immediately adjacent the pivot, resilient means acting on said arm to center said brush, a dashpot fixed on said box, a piston slidably mounted in said dashpot, means connecting said piston to the other end of said brush whereby said piston is moved in said cylinder when said carrier is shifted, a first slide mounted in said box for movement parallel to said carrier, two conducting elements on said slide spaced apart, the space between said elements lying under said contact when all parts are in neutral position, follow-up means to move said slide to position said space under said contact after displacement of said brush, a fixed brush mounted on said carrier likewise having a contact at one end, a second slide similar to said first slide mounted in said box having two conducting elements to cooperate with the contact on said fixed brush, follow-up means to position the space between the conducting elements on said second slide under the contact on said fixed brush when said carrier is displaced, rudder operating means connected to be energized in one direction or oppositely thereto when said pivoted brush contacts a conducting element on said first slide, means actuated by said rudder operating means to operate the follow-up connected to said first slide, aileron operating means connected to be energized in one direction or oppositely thereto when said fixed brush contacts a conducting element on said second slide, means actuated by said aileron operating means to operate the follow-up connected to said second slide, means connecting said carrier to said gyro to shift said carrier when said craft changes in azimuth, and means connecting said carrier to said sighting device whereby said carrier is shifted when said device is rotated in azimuth.

4. Means to stabilize an aircraft in azimuth, comprising a gyro mounted for movement about three mutually perpendicular axes and stabilized in azimuth, means to cause the gyro to precess selectively in either direction in azimuth; a control box fixed on said craft, a brush carrier slidably mounted in said box, a brush pivoted intermediate its ends on said carrier and having a contact at one end and arm extending laterally from immediately adjacent the pivot, resilient means acting on said arm to center said brush, a dashpot fixed on said box, a piston slidably mounted in said dashpot, means connecting said piston to the other end of said brush whereby said piston is moved in said cylinder when said carrier is shifted, a first slide mounted in said box for movement parallel to said carrier, two conducting elements on said slide spaced apart, the space between said elements lying under said contact when all parts are in neutral position, follow-up means to move said slide to position said space under said contact after displacement of said brush, a fixed brush mounted on said carrier likewise having a contact at one end, a second slide similar to said first slide mounted in said box having two conducting elements to cooperate with the contact on said fixed brush, follow-up means to position the space between the conducting elements on said second slide under the contact on said fixed brush when said carrier is displaced, rudder operating means connected to be energized in one direction or oppositely thereto when said pivoted brush contacts a conducting element on said first slide, means actuated by said rudder operating means to operate the follow-up connected to said first slide, aileron operating means connected to be energized in one direction or oppositely thereto when said fixed brush contacts a conducting element on said second slide, means actuated by said aileron operating means to operate the follow-up connected to said second slide, and means connecting said carrier to said gyro to shift said carrier when said craft changes in azimuth.

5. In an automatic control system for an aircraft having ailerons: a gyro stabilized in azimuth, a brush stabilized by said gyro, two unstabilized conducting elements respectively contactible with said brush upon change of movement of said craft in either of two directions; a housing, a motor therein, two spaced gears lying in substantially the same plane, means connecting said gears to said motor to drive said gears in opposite directions, an annular rib extending laterally from a face of each gear, a fixed ring surrounding and spaced from each said rib, a clutch plate disposed coaxially with each said gear to be engageable by the rib on such gear, a non-rotatable shaft having limited longitudinal movement for mounting each said gear and the clutch plate coaxial therewith, each said clutch plate being also engageable with a respective fixed ring, a pinion fixed to each clutch plate to rotate coaxially therewith, a crosshead shaft, two gears rotatable on said crosshead shaft constituting side members of a differential gear train, each said side member being meshed with a respective pinion fixed to a clutch plate, a crosshead fixed on said crosshead shaft between said side member gears, a pinion on each end of said crosshead shaft having driving engagement with both said side member gears, a drum and a cam fixed to said crosshead shaft externally of said housing, a follower contacting said cam, means actuatable by movement of said follower to operate said ailerons, a rotatable brush connected to be driven by said crosshead shaft, a first pair of conducting elements contactible by one end of said brush and a second pair of conducting elements contactible by the other end thereof, means normally holding said clutch plates in braking engagement with said fixed rings, clutch operating means energizable by current through one or the other conducting elements of said first pair to move one or the other of said spaced gears into driving engagement with the respectively cooperating clutch plate and move said clutch plate out of braking engagement with a fixed ring; means connecting said clutch operating means to said unstabilized conducting elements, means normally coacting with said gyro to hold the gyro erect and hence to effect energizing of the clutch operating means when the craft begins to roll to operate the ailerons and prevent roll of the craft, and means controlled by current through said second pair of conducting elements to render said coacting means ineffective during turns.

6. A system for controlling an aircraft having a rudder and ailerons, comprising a gyro stabilized in azimuth, rudder control energizing means and aileron control energizing means governed by said gyro; rudder operating means including a housing, a motor therein, two clutch assemblies each having a driving member and a driven member, driving connection between said motor and said clutch driving members to rotate said driving member normally inoperative, means selectively energizable by said rudder control energizing means to move each said clutch driving member into driving engagement with the cooperating driven member and move such driven member into operative position, a pinion fixed to each said driven member to rotate therewith, a differential gear having two spaced coaxial input gears each respectively engaging one of said pinions and an output shaft connected to be differentially driven by said input gears, a drum driven by said output shaft, means operatively connecting said drum to said rudder, follow-up means connected between said drum and said rudder control energizing means, aileron operating means connected to be energized by said aileron control energizing means to move said ailerons to cooperate with said rudder, follow-up means connected between said aileron operating means and said aileron control energizing means and manual means to energize said aileron operating means.

7. A system for controlling the ailerons of an aircraft, comprising a vertically stable gyro, a brush stabilized by said gyro about the fore-and-aft axis of the craft, a first two circuit closing elements disposed to bring one or the other of said elements into contact with said brush upon movement of said craft about said axis from a neutral position, follow-up elements connected to move said circuit closing elements to a neutral position with respect to said brush after displacement by movement about said axis, aileron operating mechanism connected to be energized in one or the other direction upon respective contact of one or the other of said circuit closing elements with said brush, means connecting said operating mechanism to said follow-up elements to move said circuit closing elements to neutral position, a gyro stabilized in azimuth, a second brush held fixed in azimuth by said azimuth gyro, a second two circuit closing elements disposed to effect contact of one or the other with said second brush upon azimuthal deviation of said craft from a predetermined course, follow-up elements connected to move said second two circuit closing elements to a position neutral with respect to said second brush, a rotatably mounted cam, means connected to drive said cam in one or the other direction upon contact of one or the other of said second two circuit closing means with said second brush, means connecting said cam to shift said first two circuit closing elements off neutral to energize said aileron operating mechanism, and means actuated by said cam driving means to actuate the follow-up mechanism connected to said second two circuit closing elements.

8. A system for controlling the rudder of an aircraft, comprising a gyro stabilized in azimuth, a carrier connected to be held fixed in azimuth by said gyro, a brush pivoted intermediate its ends to said carrier and having an arm extending laterally from adjacent said pivot, resilient means to center said brush, a slide mounted adjacent said brush, two insulated conducting elements on said slide in spaced relation, the space between said elements contacting one end of said brush in neutral position of said slide, follow-up elements connected to move said slide, a rotatably mounted shaft, a bell crank lever fixed on said shaft having a counterweight at one end, a link connecting the other end of said bell crank lever to the other end of said brush, a dashpot cylinder, a piston therein, a crank fixed on said shaft operatively connected to said piston, means to adjust the resistance to movement of said piston in said cylinder, rudder operating means connected to said conducting elements to be energized for operation in one or the other direction by contact of one or the other of said elements with said brush, and means connecting said rudder operating means to said follow-up elements to move said conducting elements to neutral position with respect to said brush after displacement therefrom.

9. A system for controlling the elevators and ailerons of an aircraft, comprising a gyro mounted with its spindle normally vertical, said spindle being extended at its upper end, mounting means for said gyro having fore-and-aft and athwartship axes of tilt, an upper friction roller rotatably but non-slidably mounted on said spindle at its upper end, a lower friction roller rotatably mounted on said spindle below said upper roller with limited freedom of sliding movement, said rollers being provided with interengageable teeth, a reducing gear train connecting said spindle to said lower roller to drive said lower roller, means normally maintaining said lower roller in position to effect engagement of said teeth, means energizable to slide said lower roller to disengage said teeth, a slotted bail pivotally mounted parallel to each of said axes of tilt, the said upper roller being disposed in the slot in fore-and-aft extending said bail and said lower roller being disposed in the slot in the athwartship extending said bail, a friction facing on each wall of each slot, there being but small clearance between each said facing and the juxtaposed roller, elevator operating means, aileron operating means, means including a first brush stabilized by said gyro about said athwartship axis and unstabilized circuit closing means cooperating therewith to energize said elevator operating means upon movement of said craft about its athwartship axis from a neutral position, means including a second brush stabilized by said gyro about said fore-and-aft axis and unstabilized circuit closing means cooperating therewith to energize said aileron operating means upon movement of said craft about longitudinal axis from a neutral position, follow-up means actuated by said elevator operating means to de-energize said elevator operating means, follow-up means actuated by said aileron operating means to de-energize said aileron operating means, and means to energize said means to disengage said teeth when in a banked turn.

10. A system for controlling the elevators and ailerons of an aircraft, comprising a gyro mounted with its spindle normally vertical, said spindle being extended at its upper end, mounting means for said gyro having fore-and-aft and athwartship axes of tilt, an upper friction roller rotatably mounted on said spindle at its upper end, a lower friction roller rotatably mounted on said spindle below said upper roller, said rollers being provided with interengageable teeth, a reducing gear train connecting said spindle to said lower roller to drive said lower roller, means normally maintaining said lower roller in position to effect engagement of said teeth, a slotted bail pivotably mounted parallel to each of said axes of tilt, the said upper roller being disposed in the slot in fore-and-aft extending said bail and said lower roller being disposed in the slot in the athwartship extending said bail, a friction facing on each wall of each slot, there being but small clearance between each said facing and the juxtaposed roller, elevator operating means, aileron operating means, means including a first brush stabilized by said gyro about said athwartship axis and unstabilized circuit closing means cooperating therewith to energize said elevator operating means upon movement of said craft about its athwartship axis from a neutral position, means including a second brush stabilized by said gyro about said fore-and-aft axis and unstabilized circuit closing means cooperating therewith to energize said aileron operating means upon movement of said craft about longitudinal axis from a neutral position, follow-up means actuated by said elevator operating means to de-energize said elevator operating means, follow-up means actuated by said aileron operating means to de-energize said aileron operating means, and means to disengage said teeth when in a banked turn.

11. A system for controlling the elevators and ailerons of an aircraft, comprising a gyro mounted with its spindle normally vertical, said spindle being extended at its upper end, mounting means for said gyro having fore-and-aft and athwartship axes of tilt, an upper friction roller rotatably mounted on said spindle at its upper end, a lower friction roller rotatably mounted on said spindle below said upper roller, means to drive both said rollers from said spindle, a slotted bail pivotally mounted parallel to each of said axes of tilt, the said upper roller being disposed in the slot in fore-and-aft extending said bail and said lower roller being disposed in the slot in the athwartship extending said bail, a friction facing on each wall of each slot, there being but small clearance between each said facing and the juxtaposed roller, elevator operating means, aileron operating means, means including a first brush stabilized by said gyro about said athwartship axis and unstabilized circuit closing means cooperating therewith to energize said elevator operating means upon movement of said craft about its athwartship axis from a neutral position, means including a second brush stabilized by said gyro about said fore-and-aft axis and unstabilized circuit closing means cooperating therewith to energize said aileron operating means upon movement of said craft about longitudinal axis from a neutral position, follow-up means actuated by said elevator operating means to de-energize said elevator operating means, follow-up means actuated by said aileron operating means to de-energize said aileron operating means, and means to disengage the driving connection to said upper roller when in a banked turn.

12. A system for controlling the elevators and ailerons of an aircraft, comprising a gyro mounted for tilting about fore-and-aft and athwartship axes with its spindle normally vertical, automatic erecting means including elements driven from said spindle to cause the gyro to precess when said spindle is displaced from the vertical to maintain said spindle erect, elevator operating means, aileron operating means, means including a first brush stabilized by said gyro about said athwartship axis and unstabilized circuit closing means cooperating therewith to energize said elevator operating means upon movement of said craft about its athwartship axis from a neutral position, means including a second brush stabilized by said gyro about said fore-and-aft axis and unstabilized circuit closing means cooperating therewith to energize said aileron operating means upon movement of said craft about longitudinal axis from a neutral position, follow-up means actuated by said elevator operating means to de-energize said elevator operating means, follow-up means actuated by said aileron operating means to de-energize said aileron operating means, and means to render said erecting means ineffective about said fore-and-aft axis when in a banked turn.

13. A system for controlling the elevators and ailerons of an aircraft, comprising a gyro mounted for tilting about fore-and-aft and athwartship axes with its spindle normally vertical, automatic erecting means including elements driven from said spindle to cause the gyro to precess when said spindle is displaced from the vertical to maintain said spindle erect, elevator operating means, aileron operating means, means controlled by said gyro to energize said elevator operating means upon movement of said craft about its athwartship axis, other means controlled by said gyro to energize said aileron operating means upon movement of said craft about its fore-and-aft axis, follow-up means actuated by said elevator operating means to de-energize said elevator operating means, follow-up means actuated by said aileron operating means to de-energize said aileron operating means, and means to render said erecting means inoperative about the fore-and-aft axis when in a banked turn.

14. In a gyroscopic system adapted for use on mobile craft, a gyro mounted with its spindle normally vertical, said spindle being extended at its upper end, mounting means for said gyro having fore-and-aft and athwartship axes of tilt, an upper friction roller rotatably but non-slidably mounted on said spindle at its upper end, a lower friction roller rotatably mounted on said spindle below said upper roller with limited freedom of sliding movement, said rollers being provided with interengageable teeth to drive the upper roller from the lower roller, a reducing gear train connecting said spindle to said lower roller to drive said lower roller, means normally maintaining said lower roller in position to effect engagement of said teeth, means energizable to slide said lower roller to disengage said teeth, a slotted bail pivotally mounted parallel to each of said axes of tilt, the said upper roller being disposed in the slot in fore-and-aft extending said bail and said lower roller being disposed in the slot in the athwartship extending said bail, a friction facing on each wall of each slot, there being but small clearance between each said facing and the juxtaposed roller and means for energizing said means for disengaging said teeth.

15. In an aircraft control system, a gyro mounted for tilting about two mutually perpendicular axes and with its spin axis vertical, means to maintain said spin axis vertical, a brush stabilized by said gyro about one of said tilt axes, two spaced insulated conducting elements disposed to be cooperable with said brush, said elements being unstabilized, a utility connected to be driven when a circuit is closed by contact of said brush with one of said elements; a gear sector, a gear and a follow-up lever between said gear and sector all mounted for rotation about the axis of stabilization of said brush, two meshed pinions carried by said lever, one of said pinions meshing with said sector and the other with said gear, a driving connection between said sector and said elements, a follow-up connection between said utility and said lever to move said elements to neutral with respect to said brush, and means connected to said sector to change the normal neutral position of said elements with respect to said brush and thereby establish a different flying condition about which as a norm the system will control the craft.

16. In an aircraft control system, a gyro mounted for tilting about two mutually perpendicular axes and with its spin axis vertical, means to maintain said spin axis vertical, a brush stabilized by said gyro about one of said tilt axes, two spaced insulated conducting elements disposed to be cooperable with said brush, said elements being unstabilized, a utility connected to be driven when a circuit is closed by contact of said brush with one of said elements: epicyclic gear means operative about the axis of stabilization of said brush including an output member drivingly connected to said elements, a first input member, a second input member operatively connecting said output member and said first input member, a follow-up connection between said utility and said second input member, and means connected to said first input member to change the normal neutral position of said elements with respect to said brush.

17. A system for automatically controlling an aircraft having ailerons and elevators, comprising a gyro mounted for freedom of tilt about fore-and-aft and athwartship axes, means acting automatically to maintain the spin axis of said gyro vertical, a brush stabilized by said gyro about said athwartship axis, two unstabilized spaced conducting elements mounted for oscillation about said athwartship axis to cooperate with said brush, elevator operating mechanism connected to said conducting elements to be energized when said brush contacts a said conducting element; epicyclic gear means including a gear sector connected to oscillate said elements, a gear spaced from said sector, a lever between said gear and sector, two intermeshed pinions operatively carried by said lever, one pinion being meshed with said sector and the other with said gear; a follow-up connection between said lever and said elevator operating means, a rotatable drum, a reducing gear train forming a driving connection between said gear and said drum, attitude control means connected to rotate said drum and move said elements; a second brush stabilized by said gyro about said fore-and-aft axis, a second two conducting elements mounted to oscillate about said fore-and-aft axis to contact said second brush; a second epicyclic gear means as above defined having a gear sector connected to oscillate said second two conducting elements, aileron operating means connected to be energized when said second brush contacts either of said second two elements, a follow-up connection between said aileron operating means and the lever of said second epicyclic gear means, means to actuate said banking lever simultaneously with actuation of said rudder to effect proper bank, follow-up means to reverse the movement of said banking lever, and means to render said automatically acting means ineffective about said fore-and-aft axis when said banking lever is actuated.

18. A system for controlling the ailerons of an aircraft, comprising a gyro mounted for freedom of tilt about a fore-and-aft axis, means acting automatically to maintain the spin axis of said gyro vertical, a brush stabilized by said gyro about said fore-and-aft axis, two unstabilized spaced conducting elements mounted for oscillation about said fore-and-aft axis to cooperate with said brush, aileron operating mechanism connected to be energized when said brush contacts a said conducting element; epicyclic gear means including a gear sector connected to oscillate said elements, a gear spaced from said sector, a lever between said gear and sector, two intermeshed pinions operatively carried by said lever, one pinion being meshed with said sector and the other with said gear; and a follow-up connection between said lever and said aileron operating means.

19. A system for automatically controlling an aircraft having elevators, comprising a gyro mounted for freedom of tilt about fore-and-aft and athwartship axes, means acting automatically to maintain the spin axis of said gyro vertical, a brush stabilized by said gyro about said athwartship axis, two unstabilized spaced conducting elements mounted for oscillation about said athwartship axis to cooperate with said brush, elevator operating mechanism connected to said conducting elements to be energized when said brush contacts a said conducting element; epicyclic gear means including a gear sector connected to oscillate said elements, a gear spaced from said sector, a lever between said gear and sector, two intermeshed pinions operatively carried by said lever, one pinion being meshed with said sector and the other with said gear; a follow-up connection between said lever and said elevator operating means, a rotatable drum, a reducing gear train forming a driving connection between said gear and said drum, and attitude control means connected to rotate said drum and move said elements.

20. A gyroscope including a case, means mounting said gyro for freedom of tilt about a plurality of axes, an arcuate rib on said case, the center of curvature of said rib lying at the center of tilt of said gyro, a solenoid having a longitudinally slidable core disposed to be moved away from said gyro by gravity when the solenoid is not energized, a rotatable friction roller carried by said core to be engageable with said rib eccentrically of said roller, a motor, a driving connection between said motor and said roller, and means simultaneously to energize said solenoid to bring said roller into driving contact with said rib and to energize said motor, to effect precession of said gyro.

21. A directional control system, comprising a gyro stabilized in azimuth, a box mounted adjacent thereto to be movable with respect to said gyro, a brush carrier slidably mounted in said box, a fixed brush mounted on said carrier, a first slide mounted in said box adjacent said brush for movement parallel to said carrier, two insulated conducting elements on said first slide, said brush lying between said elements in normal neutral position, a brush pivoted on said carrier intermediate the ends of said brush and having an arm extending laterally from adjacent the pivot, resilient means acting upon said arm to center said brush, a second slide mounted adjacent said pivoted brush for movement parallel to said carrier, two insulated conducting elements on said second slide, said pivoted brush lying between the conducting elements in normal neutral position, a dashpot cylinder on said box, a piston slidable in said cylinder, means operatively connecting to said piston that end of said pivoted brush that is remote from said second slide, a utility connected to be energized when said fixed brush contacts a conducting element on said first slide, a second utility connected to be energized when said pivoted brush contacts a conducting element on said second slide, and follow-up means connecting said first utility to said first slide and follow-up means connecting said second utility to said second slide to return said slides to neutral.

22. An operating utility, comprising a motor, two clutch driving members connected to said motor to be oppositely driven thereby, a clutch driven member engageable with each said driving member, braking means normally holding said driven members inactive, means selectively energizable to engage a said driving member with the cooperating driven member, differential gear means comprising two input members each driven by a respective clutch driven member, an output member differentially connecting said input members, a drum driven by said output member and a follow-up element driven by said output member.

23. Means for operating the ailerons of an aircraft for effecting banking, comprising a motor, two clutches each including a driving member and a driven member, said driving members being connected to said motor to be driven in opposite directions, a differential gear including two input members and an output member differentially connecting said input members, a cam connected to be driven by said output member, a follower operated by said cam, aileron operating means, means to control said aileron operating means and means connecting said follower to said control means to energize said aileron operating means to effect banking adjustment of said ailerons.

24. Means to control in azimuth an aircraft having a rudder, and control surfaces functionally equivalent to ailerons, comprising a gyro mounted for movement about three mutually perpendicular axes with its spin axis horizontal, means to cause the gyro to precess selectively in either direction in azimuth; a brush carrier connected to said gyro to be stabilized thereby, a first electrically conductive brush fixedly mounted on the carrier, a second like brush pivotally mounted on the carrier, a respective pair of conductive elements insulated from each other and disposed to be contactible by each brush and mounted to partake of movement of the craft relatively to the brushes, means to rock the second brush on its pivot to increase the rate of movement thereof relative to the conductive elements cooperating therewith over the rate of movement of the first brush relative to its cooperating conductive elements; means connected to be energized by current through the first brush and an associated conductive element to operate said control surfaces, means connected to be energized by current through the second brush and an associated conductive element to operate the rudder; follow-up means connecting said control surfaces to the conductive elements cooperating with the first brush to restore the said elements to neutral position with respect to the first brush, and follow-up means connecting the rudder to the conductive elements cooperating with the second brush to restore said elements to neutral position with respect to the second brush, said rudder follow-up means including a device that is rendered ineffective while the rudder is displaced beyond a predetermined degree in either direction from its central position to permit manual control of the rudder while displaced beyond the said predetermined degree.

25. Means to control in azimuth an aircraft having a rudder, and control surfaces functionally equivalent to ailerons, comprising a gyro mounted for movement about three mutually perpendicular axes with its spin axis horizontal, means to cause the gyro to precess selectively in either direction in azimuth; a brush carrier connected to said gyro to be stabilized thereby, a first electrically conductive brush fixedly mounted on the carrier, a second like brush pivotally mounted on the carrier, a respective pair of conductive elements insulated from each other and disposed to be contactible by each brush and mounted to partake of movement of the craft relatively to the brushes, means to rock the second brush on its pivot to increase the rate of movement thereof relative to the conductive elements cooperating therewith over the rate of movement of the first brush relative to its cooperating conductive elements; means connected to be energized by current through the first brush and an associated conductive element to operate said control surfaces, means connected to be energized by current through the second brush and an associated conductive element to operate the rudder; follow-up means connecting said control surfaces to the conductive elements cooperating with the first brush to restore the said elements to neutral position with respect to the first brush, and follow-up means connecting the rudder to the conductive elements cooperating with the second brush to restore said elements to neutral position with respect to the second brush.

26. A gyro-vertical construction comprising a casing, a rotor journaled therein, spinning means therefor, a gimbal supporting said casing for oscillation about axes perpendicular to each other, and erecting means comprising a normally vertical pin revolubly mounted on said casing, rotating means therefor, and a pair of masses freely mounted independently of each other for oscillation under the influence of gravity about mutually perpendicular axes, each of said masses having a slot therein extending in a plane passing through the axis of oscillation thereof and said pin being loosely embraced within both of said slots, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing.

27. A gyro-vertical construction comprising a casing, a rotor journaled therein, spinning means therefor, a gimbal supporting said casing for oscillation about axes perpendicular to each other, and erecting means comprising a normally vertical pin revolubly mounted on said casing, rotating means therefor, and a pair of masses freely mounted independently of each other for oscillation under the influence of gravity about mutually perpendicular axes, each of said masses having a slot therein extending in a plane passing through the axis of oscillation thereof and said pin being loosely embraced within both of said slots, said masses being substantially in unstable equilibrium when said pin is vertical, but being displaced from position of equilibrium when said pin is removed from the vertical whereby they are pressed by gravity against the rotating pin to develop friction therebetween and thereby generate an erecting torque acting on said casing.

28. A gyro-vertical construction comprising a casing, means for supporting said casing for oscillation about mutually perpendicular axes, a rotor journaled in said casing, and erecting means comprising two masses freely mounted for oscillation under the influence of gravity independently of each other and about axes each of which is perpendicular to the vertical plane which includes one of said axes of said casing, both of said masses being substantially in equilibrium and crossing each other in spaced apart relation, a normally vertical pin revolubly mounted on said casing and extending through at least a portion of both of said masses to make frictional engagement therewith when said pin is displaced from the vertical, and means for rotating said pin, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing.

29. A gyro-vertical construction comprising a casing, means for supporting said casing for oscillation about mutually perpendicular axes, a rotor journaled in said casing for rotation about a spinning axis perpendicular to at least one of said axes of said casing, and erecting means comprising two masses freely mounted for oscillation under the influence of gravity independent of each other and about axes each of which is perpendicular to the vertical plane which includes one of said axes of said casing, both of said masses being substantially in unstable equilibrium and crossing each other in spaced apart relation, a normally vertical pin revolubly mounted on said casing and extending through at least a portion of both of said masses to make frictional engagement therewith when said pin is displaced from the vertical, and means for rotating said pin, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing.

30. A gyro-vertical construction comprising a casing, means for supporting said casing for oscillation about mutually perpendicular horizontal axes, a rotor journaled in said casing for rotation about a spinning axis perpendicular to both of said axes of said casing, and erecting means comprising two masses freely mounted for oscillation under the influence of gravity independently of each other and about axes each of which is perpendicular to the vertical plane which includes one of said axes of said casing, both of said masses being in unstable equilibrium and extending upwards from their respective supports to cross each other above said casing in spaced apart relation, each of said masses having a slot extending longitudinally thereof, a normally vertical pin revolubly mounted in said casing and extending upwards therefrom to be embraced in both of said slots and make frictional engagement with at least one of said masses when said pin is displaced from the vertical, and means for rotating said pin, said masses being substantially in equilibrium when said pin is vertical but being displaced from position of equilibrium when said pin is removed from the vertical whereby they are pressed by gravity into drag-exerting relationship with the rotating pin and thereby generate an erecting torque acting on said casing.

31. A gyro-vertical construction comprising a casing, means for supporting said casing for oscillation about mutually perpendicular horizontal axes, a rotor journaled in said casing for rotation about a spinning axis perpendicular to both of said axes of said casing, and erecting means comprising a pair of stators disposed in spaced apart relation and crossing each other in mutually perpendicular planes, each of said stators having a longitudinally extending slot therein each of said stators being freely mounted for oscillation under the influence of gravity about an axis normally coinciding with one of said axes of said casing and each of said stators extending partially around said casing in spaced relation thereto, and a rotor cooperatively associated with said stators and comprising a pin revolubly mounted in said casing and extending therefrom, said pin being embraced by both of said stators by extending into both of said slots, and means for rotating said pin, said stators being substantially in equilibrium when said pin is removed from the vertical whereby they are pressed by gravity into drag-exerting relationship with the rotating pin and thereby generate an erecting torque acting on said casing.

32. In a gyro-vertical construction, a casing, means supporting said casing for oscillation about mutually perpendicular axes, a rotor journaled within said casing for spinning about an axis perpendicular to both of said axes of said casing, means journaled in said casing providing a second rotor, and a pair of stators cooperatively associated with said second rotor to be selectively and frictionally engaged thereby upon displacement of said second rotor in any direction about said axes of said casing from predetermined position to develop friction therebetween and thereby generate an erecting torque acting upon said casing in a direction substantially perpendicular to its precedent displacement.

33. In a gyro-vertical construction, a casing, means supporting said casing for oscillation about mutually perpendicular axes, a rotor journaled within said casing for spinning about an axis perpendicular to both of said axes of said casing, means journaled in said casing providing a second rotor, and a pair of stators cooperatively associated with said second rotor to be selectively and frictionally engaged thereby upon displacement of said second rotor in any direction about said axes of said casing from predetermined position to develop friction therebetween and thereby generate an erecting torque acting upon said casing in a direction substantially perpendicular to its precedent displacement, each of said stators being mounted for oscillation about one of said axes of said casing and crossing the other adjacent the position of their engagement by said second rotor.

34. In a gyro-vertical construction, a casing, means supporting said casing for oscillation about mutually perpendicular axes, a rotor journaled within said casing for spinning about an axis perpendicular to both of said axes of said casing, means journaled in said casing providing a second rotor, and a pair of stators cooperatively associated with said second rotor to be selectively and frictionally engaged thereby upon displacement of said second rotor in any direction about said axes of said casing from predetermined position to develop friction therebetween and thereby generate an erecting torque acting upon said casing in a direction substantially perpendicular to its precedent displacement, each of said stators being mounted for oscillation about one of said axes of said casing and crossing the other adjacent the position of their engagement by said second rotor, each of said stators being arcuate about a center lying at the intersection of said axes of said casing whereby said second rotor remains in alignment with each of said stators while moving longitudinally thereof.

THEODORE H. BARTH.

REFERENCES CITED

The following references are of record in the file of this patent:

UNITED STATES PATENTS

| Number | Name | Date |
|---|---|---|
| 1,169,695 | Thaw | Jan. 25, 1916 |
| 1,203,218 | Macy | Oct. 31, 1916 |
| 1,335,055 | Hedenstrom | Mar. 30, 1920 |
| 1,368,226 | Sperry | Feb. 8, 1921 |
| 1,418,335 | Sperry | June 6, 1922 |
| 1,518,892 | Bates | Dec. 9, 1924 |
| 1,662,566 | Dohle | Mar. 13, 1928 |
| 1,912,112 | Wunsch | May 30, 1933 |
| 1,918,082 | Carlson | July 11, 1933 |
| 1,919,112 | Bates | May 30, 1933 |
| 2,137,974 | Fischel | Nov. 22, 1938 |
| 2,203,671 | Carlson | June 11, 1940 |
| 2,270,875 | Hanson et al. | Jan. 27, 1942 |

FOREIGN PATENTS

| Number | Country | Date |
|---|---|---|
| 154,277 | Great Britain | Nov. 29, 1920 |